(12) United States Patent
Sabine

(10) Patent No.: US 6,918,214 B2
(45) Date of Patent: Jul. 19, 2005

(54) ANTIPERCH DEVICE FOR BIRDS

(76) Inventor: Gordon A. Sabine, 14441 Dunbar Pl., Sherman Oaks, CA (US) 91423

( * ) Notice: Subject to any disclaimer, the term of this patent is extended or adjusted under 35 U.S.C. 154(b) by 0 days.

(21) Appl. No.: 09/792,748

(22) Filed: Feb. 23, 2001

(65) Prior Publication Data

US 2002/0011036 A1 Jan. 31, 2002

Related U.S. Application Data

(60) Provisional application No. 60/190,694, filed on Jul. 26, 2000.

(51) Int. Cl.[7] ............................................. A01K 3/00
(52) U.S. Cl. ........................ 52/101; 119/713; 119/903; 119/57.9; 119/63; 119/59; 119/469; 49/58; 49/59; 256/11
(58) Field of Search ........................... 52/101; 119/713, 119/903, 57.9, 63, 59, 469; 49/58, 59; 256/11

(56) References Cited

U.S. PATENT DOCUMENTS

| | | | |
|---|---|---|---|
| 168,446 A | 10/1875 | Blodget | |
| 1,523,811 A | * 1/1925 | Lichtenberg et al. | 52/583.1 |
| 2,142,371 A | * 1/1939 | Peles | 52/101 |
| 2,306,080 A | 12/1942 | Peles | |
| 2,485,148 A | * 10/1949 | Fralin | 52/101 |
| 2,887,730 A | 5/1959 | Bittner | |
| 3,435,567 A | * 4/1969 | Tyson | 52/125.4 |
| 4,185,581 A | * 1/1980 | Tilton | 116/22 A |
| 4,962,619 A | 10/1990 | Chatten | |
| 5,058,335 A | 10/1991 | Richter | |
| 5,092,088 A | * 3/1992 | Way | 52/101 |
| 5,167,099 A | 12/1992 | Nelson | |
| 5,181,338 A | 1/1993 | Chatten | |
| 5,341,759 A | 8/1994 | Hood | |
| D357,771 S | 4/1995 | Townsend, III et al. | |
| 5,606,830 A | 3/1997 | Townsend, Jr. et al. | |
| 5,615,524 A | 4/1997 | Costa, Sr. | |
| 5,649,394 A | 7/1997 | Ohba | |
| 5,713,160 A | * 2/1998 | Heron | 52/101 |
| 5,755,179 A | 5/1998 | Webber | |
| 5,765,319 A | * 6/1998 | Callaghan, Jr. | 52/101 |
| 5,974,998 A | 11/1999 | Gregg, III | |
| 6,003,471 A | 12/1999 | Ohba | |

* cited by examiner

Primary Examiner—Carl D. Friedman
Assistant Examiner—Steve Varner
(74) Attorney, Agent, or Firm—Woodard, Emhardt, Moriarty, McNett & Henry LLP

(57) ABSTRACT

An antiperch device for deterring birds from perching on undesired perch locations. The device includes various embodiments which are constructed of wires forming arcs and/or wires that are parallel to and spaced above an object such as a light fixture to be protected. The wires are sufficiently flexible and have a small enough diameter to prevent the birds from getting a secure footing thereon but are sufficiently stiff to keep the birds from reaching the object.

2 Claims, 27 Drawing Sheets

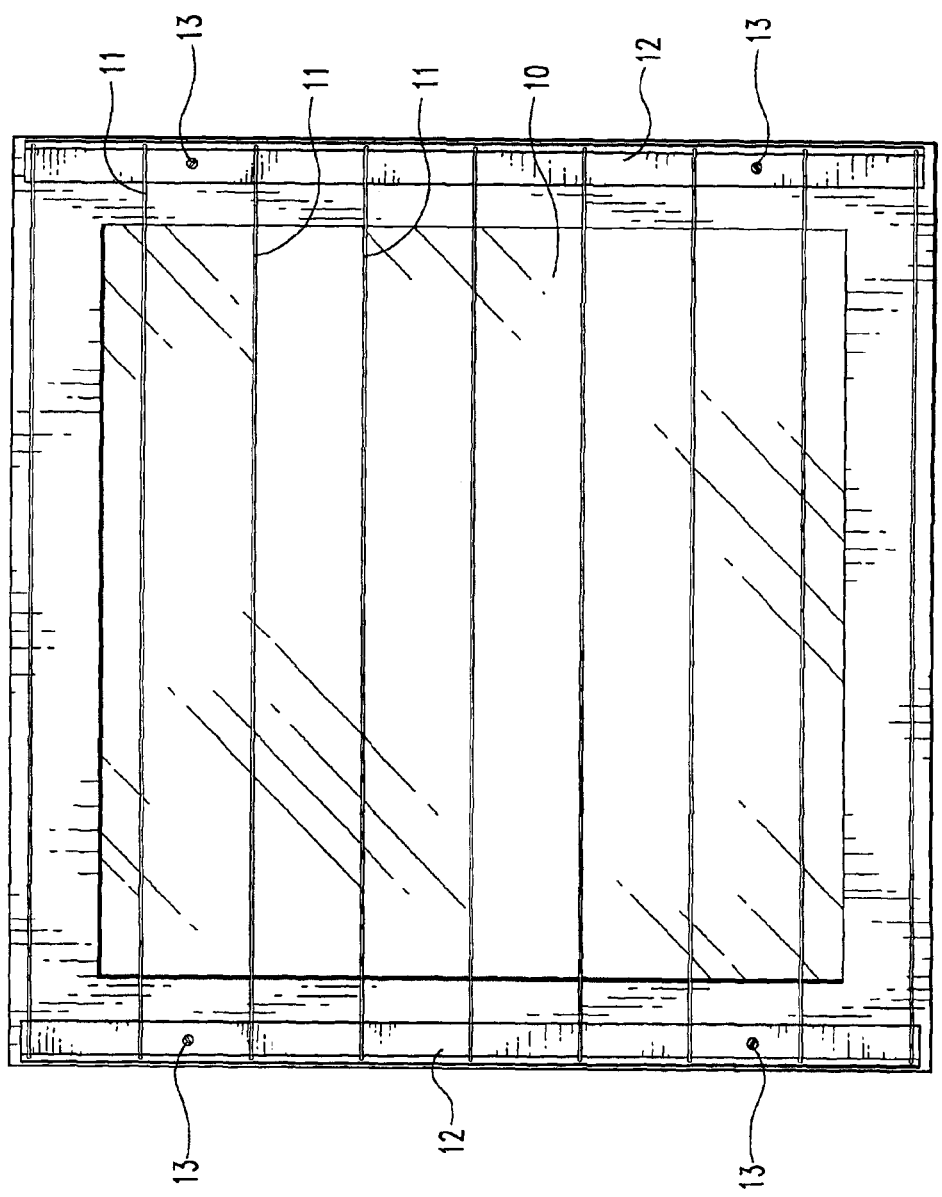

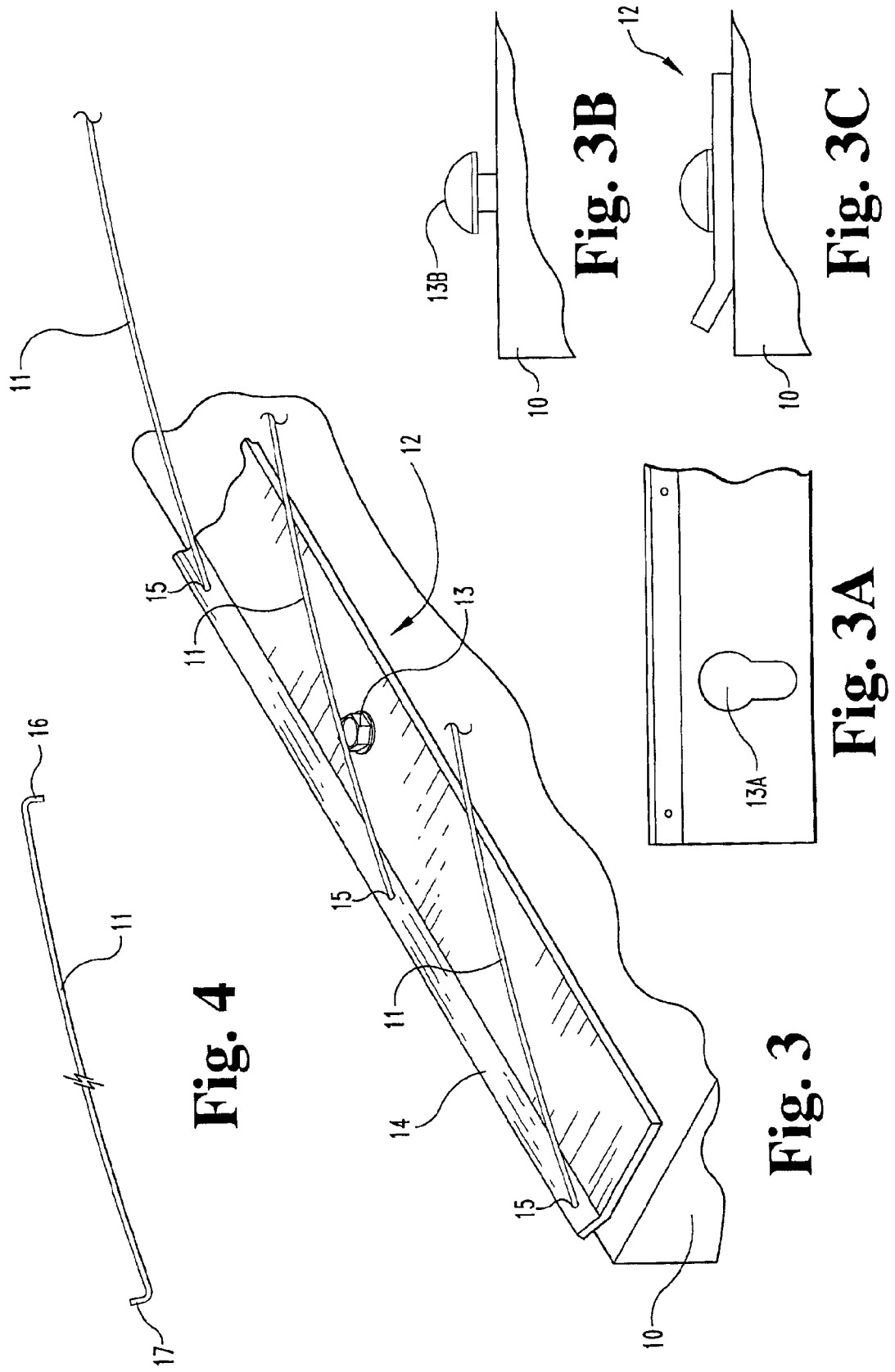

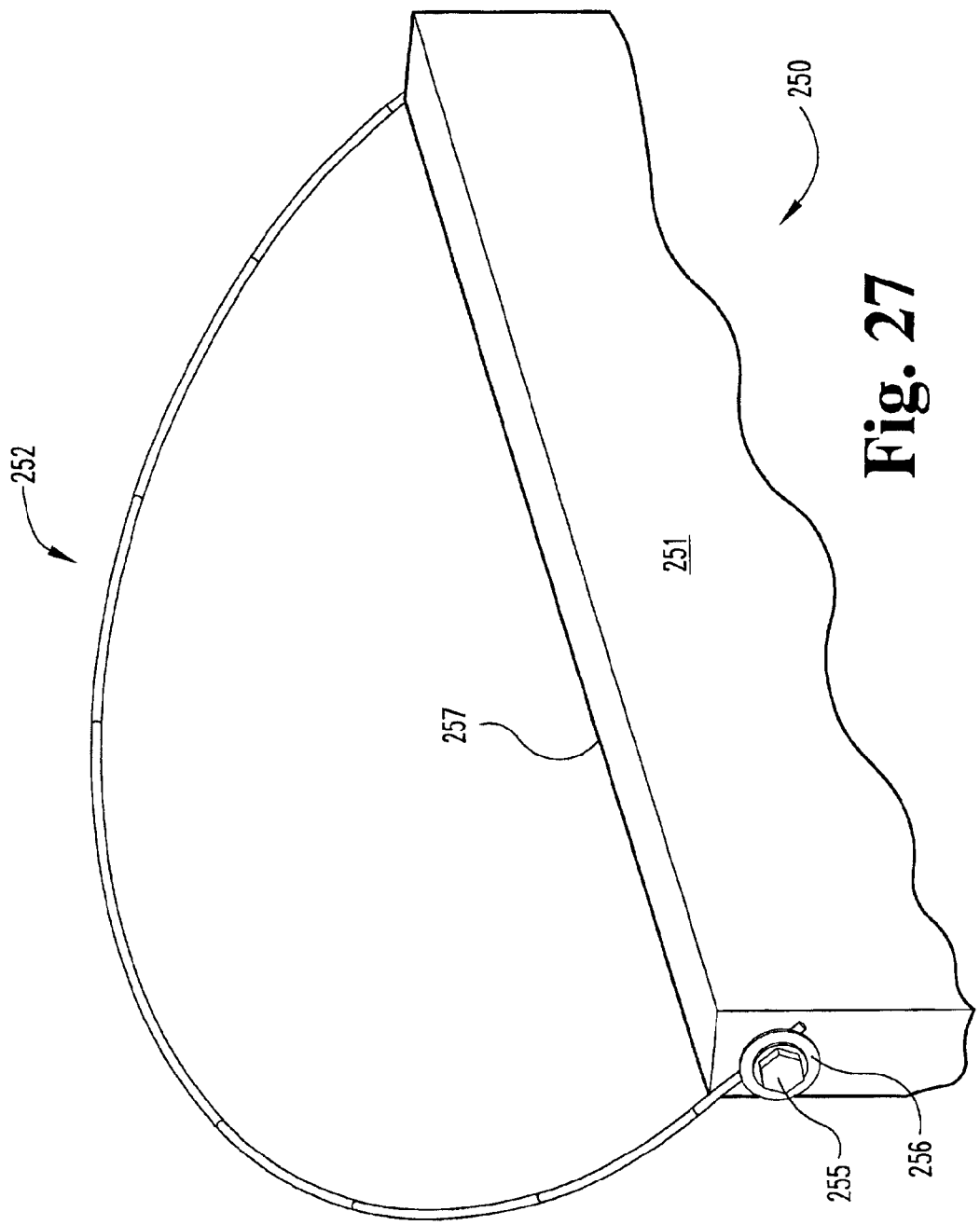

ANTIPERCH DEVICE FOR BIRDS

FIELD OF THE INVENTION

The present invention relates to apparatus for preventing, discouraging and/or deterring birds from landing on undesired perch locations and claims priority to U.S. Provisional Application Ser. No. 60/190,694 filed Jul. 26, 2000.

DESCRIPTION OF THE RELATED ART

In many cases birds such as pigeons, swallows, seagulls, starlings, owls, hawks and crows create unwelcome noise. Also their droppings are unsightly and are a threat to human health. Various means have been designed to keep birds off of buildings, light fixtures, billboards and narrow ledges, however, these devices have not always been completely effective. It is an object of the present invention to provide an improved device for keeping, preventing, discouraging and/or deterring birds from landing on undesired perch locations.

SUMMARY OF THE INVENTION

One embodiment of the present invention consists of an antiperch device for birds. There is provided a series of wires which are fixed at their opposite ends in relation to an object to be protected, such as for example, a light fixture. The wires are fixed with each wire arranged in an arc over the object to be protected. The wires have sufficient stiffness to keep the birds from reaching the object to be protected but also are sufficiently flexible and have a small enough diameter that the birds cannot obtain a secure footing on the wires.

Another embodiment of the present invention is an antiperch device for birds which includes an elongated wire having a major portion of its length arranged parallel to the surface of an object to be protected. The wire is spaced above the object and has sufficient stiffness to keep the birds from reaching the object but is also sufficiently flexible and have a small enough diameter that the birds cannot obtain a secure footing on the wire.

Still another embodiment of the invention might include an antiperch device for birds including a first elongated wire having a major portion formed in an elongated snowshoe shape. The major portion is arranged in a plane which is adapted to be parallel to the surface of the object to be protected and is spaced above that object. A second elongated wire having a second major portion is located centrally of the snowshoe shape and extends longitudinally of the shape. The second wire is welded to the first wire. There is also included at least one third wire which has a third major portion extending across the snowshoe shape and welded to the first and second wires. The wires have sufficient stiffness to keep the birds from reaching the object but are also sufficiently flexible and have a small enough diameter that the birds cannot obtain a secure footing on the wires.

Still another embodiment of the invention is an antiperch device for birds for preventing the birds from perching on an object. The device includes a first elongated wire having a major portion formed in an elongated snowshoe shape. The major portion is arranged in a plane which is adapted to be parallel to the surface of the object and is spaced above the object. There is a second elongated wire which has a second major portion located centrally of the snowshoe shape and extending longitudinally of the snowshoe shape. The second wire is welded to the first wire. A third elongated wire and a fourth elongated wire are provided. The third and fourth elongated wires have major portions which cross each other and are welded to the first elongated wire. The wires have sufficient stiffness to keep the birds from reaching the object but are also sufficiently flexible and have a small enough diameter that birds cannot obtain a secure footing on the wires.

Still a further embodiment of the invention is an antiperch device for birds for mounting on an object to prevent the birds from perching on the object and includes a first elongated wire which is curved into a circular shape. Second and third elongated wires are provided and each have a major portion which cross each other and are welded to the first elongated wire. Each of the second and third wires includes a pair of mounting portions which extend perpendicularly from the opposite ends of the major portion of the elongated wire and are adapted to mount the antiperch device on the object with the circular shape located in a plane spaced above the object. The wires have sufficient stiffness to keep the birds from reaching the object but also are sufficiently flexible and have a small enough diameter that the birds cannot obtain a secure footing on the wires.

Another embodiment of the invention involves a plurality of wires having a straight major portion each of the major portions being parallel to one another and arranged in an equally spaced series which defines the plane which is adapted to be parallel to the surface of the object to be protected and is spaced above the object. Each of these wires includes a first mounting portion and a second mounting portion. Both the first mounting portion and the second mounting portion extend perpendicularly from the respective major portion. Each of the first mounting portions are parallel to one another and are arranged in an equally spaced series which defines a plane. Also each of the second mounting portions are parallel to one another and arranged in an equally spaced series which defines a plane. A first wire is adapted to be positioned at the surface of the object to be protected and is welded to the first mounting portions. Also a second wire is adapted to be positioned at the surface of the object and is welded to the second mounting portions. Depending upon the configuration of the object one or more of the above defined arrangements of varying size can be used to protect the object.

Still another embodiment of the invention involves an antiperch device for birds for mounting an object to prevent birds from perching on the object. The device comprises a plurality of wires each having a straight major portion, a first mounting portion and second mounting portion. Each of the wires has its first mounting portion and second mounting portion parallel to one another and located at the opposite ends of the major portion of the wire. There is also provided at least one tube which receives therein the first mounting portions of two wires of said plurality of wires. Thus the two wires are capable of pivoting relative to one another. The first mounting portions each have feet retaining the mounting portions within the tube. The feet are bendable so as to flatten against the tube to lock the major portions of the two wires at a desired pivoted angle relative to one another.

BRIEF DESCRIPTION OF THE DRAWINGS

FIG. 2 is a top plan view of the fixture with the antiperch device mounted thereon.

FIG. 3 is a fragmentary perspective detail view of a support plate forming a portion of the antiperch device.

FIG. 3A is a fragmentary top plan view of a support plate forming an alternative embodiment of the invention.

FIG. 3B is a fragmentary side elevation of a light showing a mounting means for the support plate.

FIG. 3C is a fragmentary side elevation showing the support plate mounted on the light.

FIG. 4 is a side view of a single one of a wire making up a portion of the structure of FIGS. 1 and 2.

FIG. 27 is a perspective view of still a further embodiment of the invention.

DESCRIPTION OF THE PREFERRED EMBODIMENT

Figure 1:
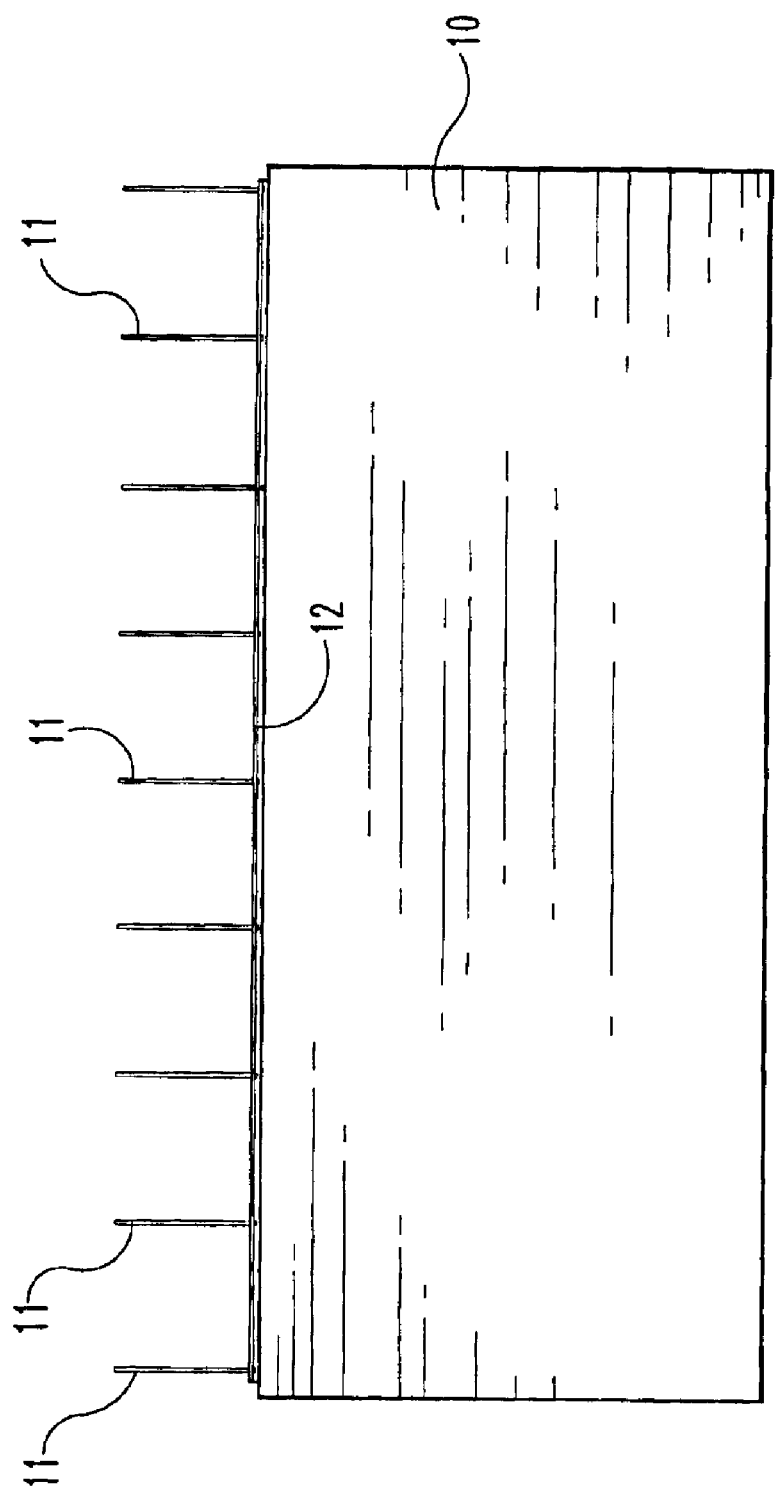
FIG. 1 is a side elevation of an outdoor light fixture having the antiperch device of the present invention mounted thereon.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the intention as illustrated therein being contemplated as would normally occur to one skilled in the art to which the invention relates.

Referring now to the drawings, FIG. 1 shows a light fixture at 10 which has mounted on it a series of wires 11 by means of a pair of support plates 12 a representative one of which is also shown in detail in FIG. 3 along with associated structure. The light fixture might be, for example, an outdoor metal halide light fixture supported perhaps twelve or fifteen feet in the air on a light pole. As can be seen in FIG. 2, there are provided two support plates 12 which mount the wires 11 on the top of the light fixture 10. The support plates are attached to the light fixture by screws 13 which extend through bores in the plate 12 into the light fixture. Each of the wires 11 has a bend on its opposite ends which bend is hooked into a respective one of the openings 15. The wires 11 are of such a length that they are resiliently deformed and each define an arc configuration arcing over the top of the light fixture 10. The wires 11 are spaced sufficiently close to one another that the birds cannot land on the light fixture between the arced wires. The wires have a sufficient amount of stiffness to keep the birds from reaching the light fixture 10 yet they are sufficiently flexible and have a small enough diameter that the birds cannot obtain a secure footing by landing and attempting to perch on the wires 11. Referring to FIGS. 3A, 3B and 3C, the support plate may be mounted on the light fixture 10 in various ways. Thus instead of the screws 13 a pair of keyhole shaped openings 13A may be provided. Welded to the light are mushroom shaped projections 13B. The support plate 12 is locked in place on the light by inserting the mushroom shaped projections through the larger part of the openings 13A and then locking the support plate in place with the neck of the mushroom shape in the smaller part of the keyhole opening 13A.

In one embodiment of the invention the wires have a diameter of 0.062" or $\frac{1}{16}^{th}$" diameter and are Type 302 stainless steel spring wire. Another embodiment uses type 304 stainless steel spring wire of the same diameter. In still another embodiment of the invention the wire is 0.063" diameter Type 316 stainless steel spring wire. Referring to FIG. 4, there is illustrated a representative one of the wires 11 showing that in its unstressed state the wire is straight and has opposite ends 16 and 17 that project in opposite directions. That is the opposite ends are parallel and project in opposite directions. It has been found that by initially bending the opposite ends to project in opposite directions the wire is prevented from becoming disconnected from the support plates 12 and instead remains securely fastened even though the wire is resiliently displaced. Also the wires also assume an arc which projects directly away from the object. This effect is caused by the fact that the flange 14 acts on one end 16 or 17 of the wire 11. It will also be noted from FIG. 3 that the support plate 12 is mounted on the light 10 with the raised portion 14 or flange of the plate facing outwardly of the light. This is true of both plates 12 and facilitates secure mounting of the arced wires 11.

Figure 5:
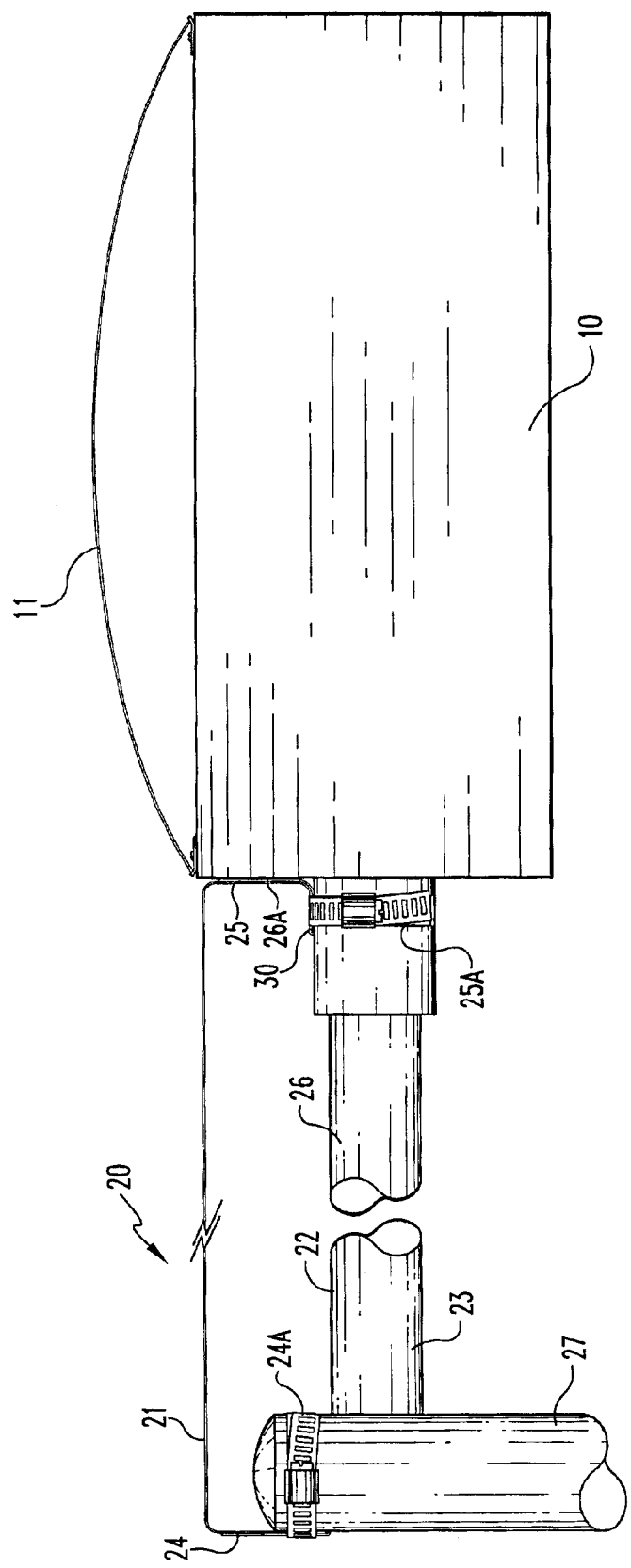
FIG. 5 is a side elevation of a light fixture with the antiperch device of FIG. 1 and an alternative version of the antiperch device mounted thereon.

Referring to FIG. 5 there is illustrated a light fixture that is protected from having birds perch on it by means of the structure shown in FIGS. 1–4 but also having an additional antiperch device 20. The device 20 consists of a single elongated wire that has a major portion 21 of its length arranged parallel to the surface 22 of the object 23 to be protected. It has been found that a spacing of approximately 3 inches from the object is an appropriate spacing for the single elongated wire 20. Admittedly the upper surface of the light mounting structure 26 and 27 is not completely flat and horizontal but it is generally so. Thus in one embodiment of the invention the major portion 21 is spaced one inch from the post 27 and three inches from the upper surface of the arm 26.

In addition to the major portion 21 of the wire being arranged parallel to the surface of the object the wire has mounting portions 24 and 25 each of which extends perpendicularly from the major portion 21. As illustrated the mounting portion 24 is clamped to the object to be protected by a clamp 24A and the mounting portion 25 is clamped to the object by a clamp 25A. In the case of the mounting portion 25 there is a foot 30 formed on the distal end of the mounting portion which is used to secure the single elongated wire 20 in place. The foot 30 extends at a 90-degree angle from the main body 26A of the mounting portion 25. Both mounting portions 24 and 25 extend at 90-degree angles from the major portion 21 of the device 20.

The wire 20 has sufficient stiffness to keep the birds from reaching the object but also is sufficiently flexible and has a small enough diameter that the bird cannot light upon the wire and obtain a secure footing. It has been found that use of a wire of 0.062 inches or $1/16^{th}$ inch diameter type 302 or 304 stainless steel spring wire or 0.063 inch diameter type 316 stainless steel spring wire is an appropriate wire to provide the correct amount of stiffness and flexibility.

Figure 6:
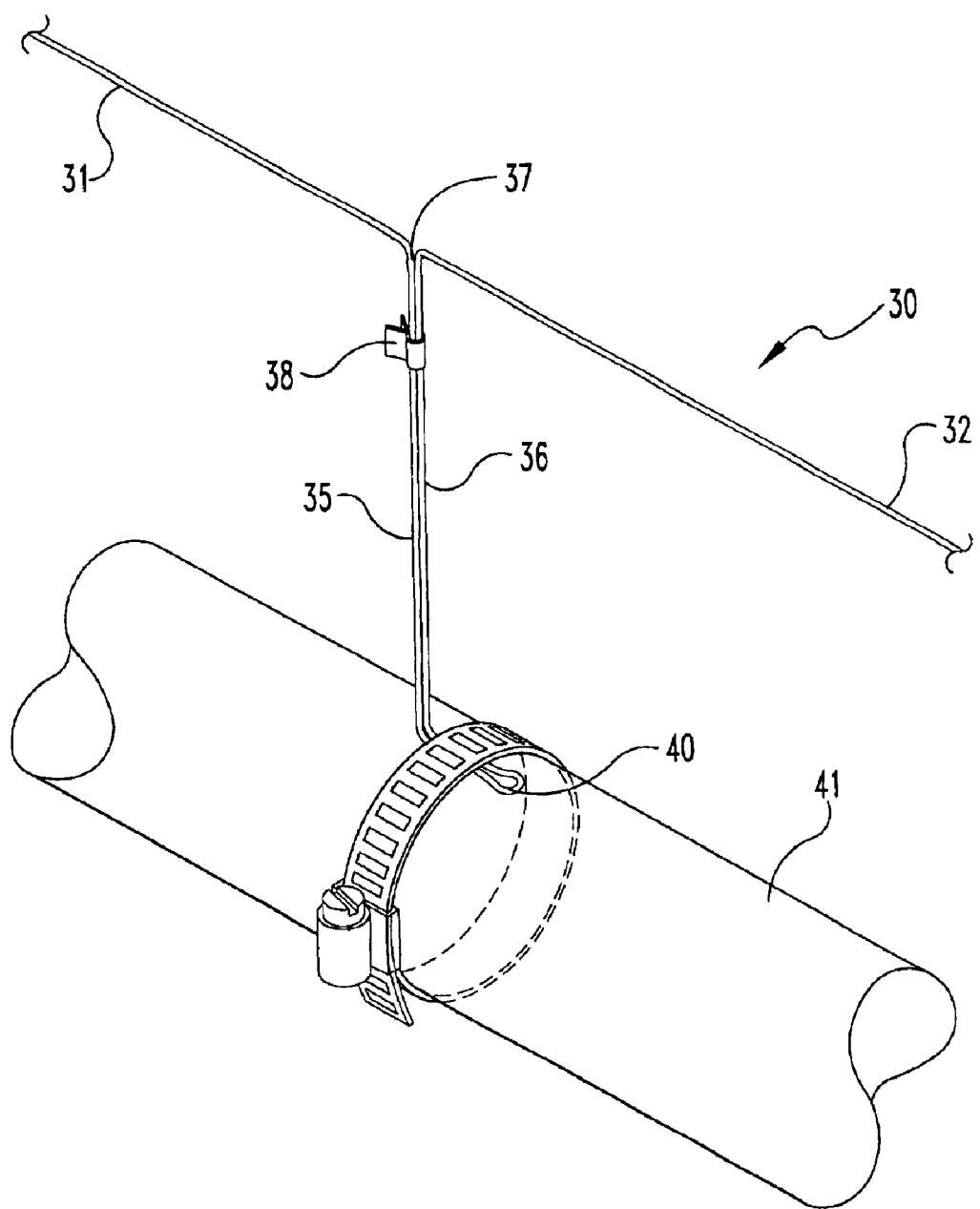
FIGS. 6, 7A, 7B, 8A and 8D are fragmentary perspective views of further embodiments of the invention.
Figure 7A:
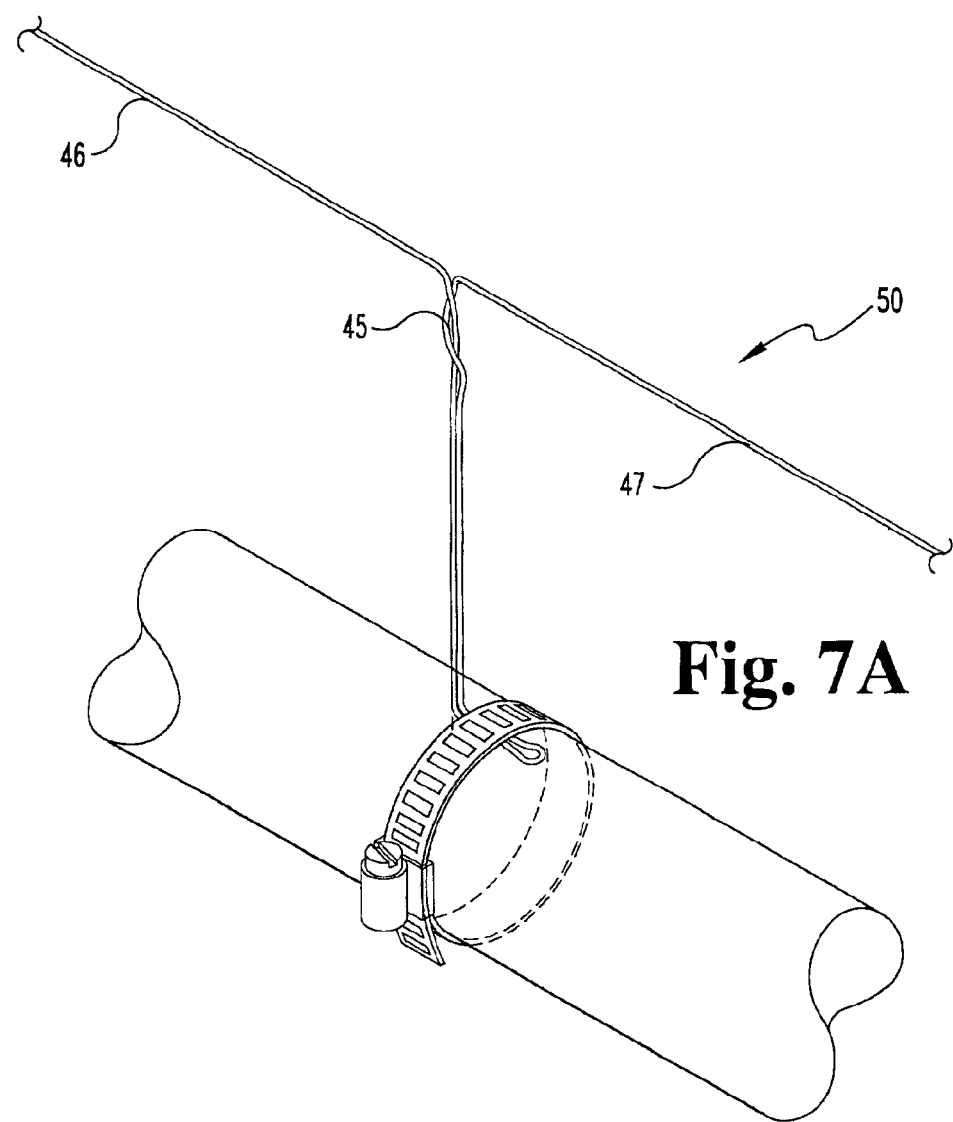
Figure 7B:
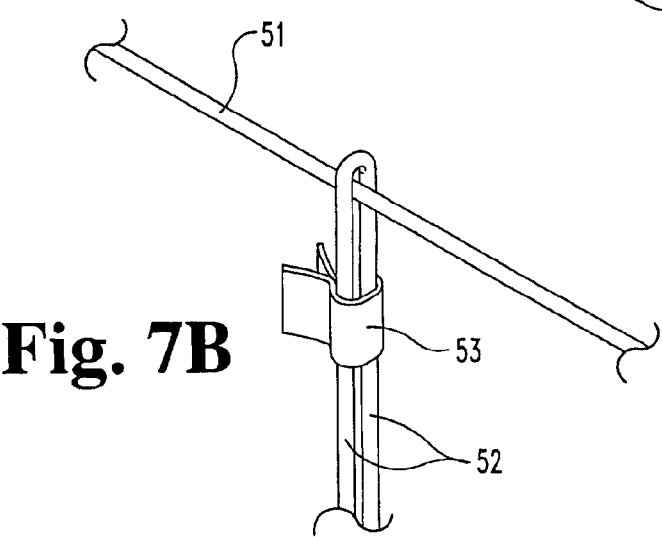

FIGS. 6, 7A, and 7B show various alternative means for securing a single wire to an object to be protected. The device shown in FIG. 5 requires only two mounting portions and two clamps because the extension of the object is not sufficiently great to require additional mounting portions. The treatments shown in FIGS. 6, 7A and 7B are appropriate for situations in which the wire requires more than two mounting portions. Referring specifically to FIG. 6 the illustrated antiperch device includes a wire 30 which includes two major portions 31 and 32 each of which has extending perpendicularly thereto and therefrom a mounting portion 35 and 36. The two mounting portions 35 and 36 are secured together generally at 37 and have a loop 40 formed on their lower distal end. In the illustrated embodiment the securing together at generally the location 37 is accomplished by a resilient clamp 38 formed from resilient metal material. Alternatively, the securing together can be accomplished by welding. The loop 40 adjoins the two mounting portions 35 and 36, projects perpendicularly therefrom and provides a means for securing the antiperch device to the object 41. In other respects the antiperch device 30 is identical to the device 20 shown in FIG. 5. That is, it includes single wire mounting portions identical to 24 and 25 and clamps 24A and 25A.

Referring to FIG. 7A an alternative embodiment of the invention is illustrated wherein, instead of a clamp 38 or weld, portions of the wire are twisted together to provide the strength necessary to provide the appropriate amount of stiffness of the wire for preventing the birds from perching on the object. The twisted wire portions 45 are located adjacent to the major portion 46 and 47 of the elongated wire 50.

FIG. 7B shows still another embodiment of the invention wherein the major portion of the elongated wire 51 has a wire bent over it forming two side-by-side wire sections 52 which also may have an appropriate pair of feet (not shown) at the lower end for securing the wires 52 to an object in the same fashion as illustrated in FIGS. 6 and 7A but with the feet being separate and not forming a loop. Resilient sheet metal clamp or clip 53 is provided for additional stability.

Figure 8A:
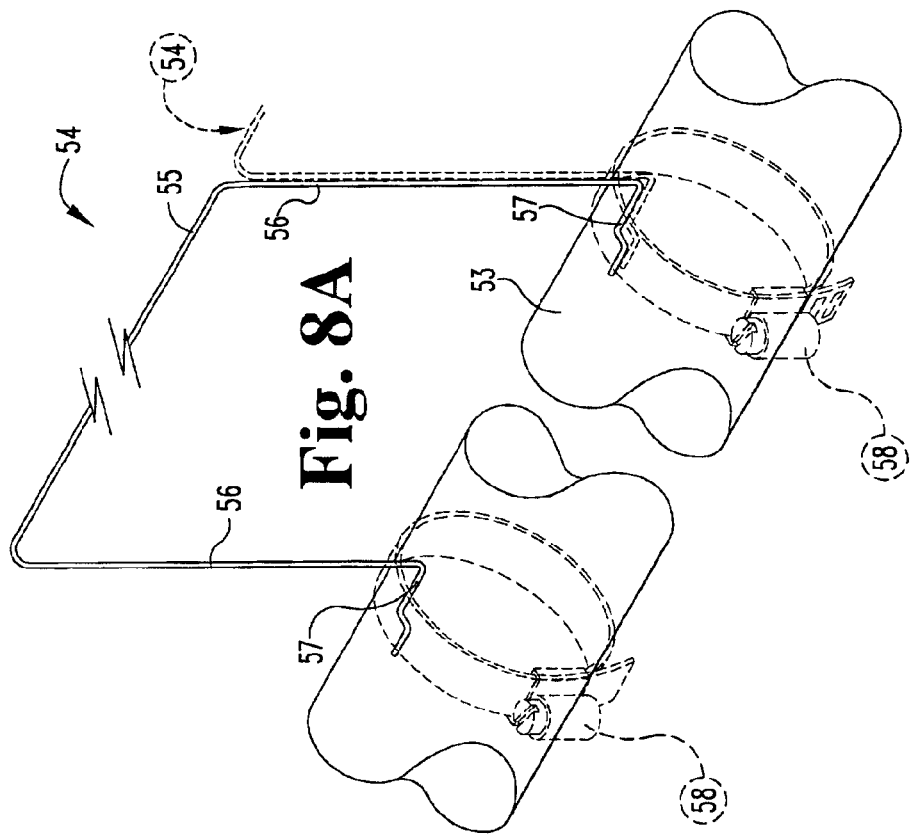
Figure 8B:
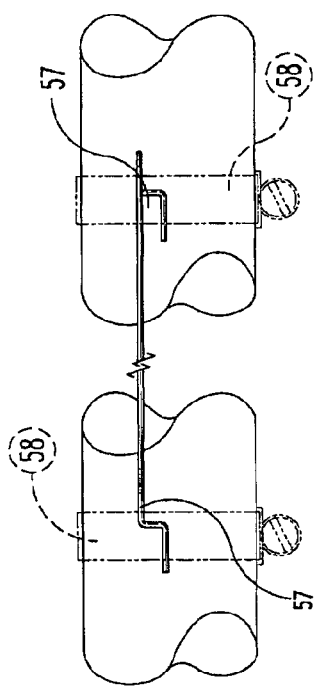
FIG. 8B is a top plan of the embodiment of FIG. 8A.
Figure 8C:
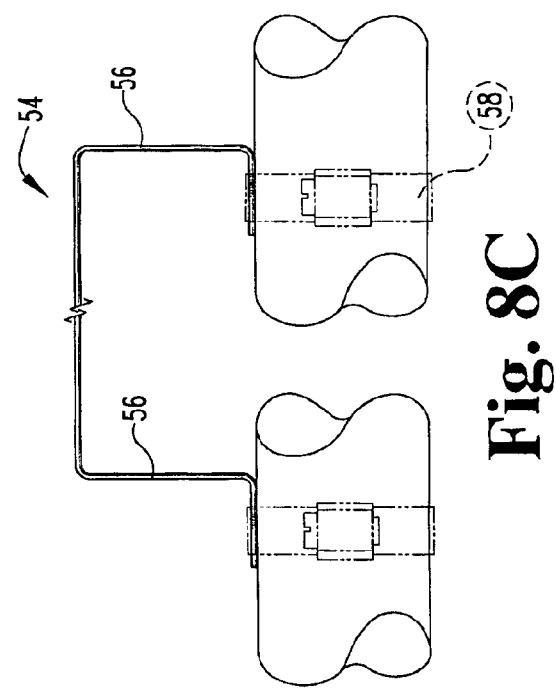
FIG. 8C is a side elevation of the embodiment of FIGS. 8A and 8B.

FIGS. 8A, 8B and 8C show still another embodiment of the invention for providing a single wire 54 for mounting above an arm such as the arm 53 of a light fixture or the like. The wire 54 includes a straight major portion 55. The wire is bent at 90 degrees to form a pair of mounting portions 56. The wire also includes L-shaped portions 57 which extend perpendicularly from the distal ends of the mounting portions 56. Each of the L-shaped portions 57 has one leg which is parallel to the straight major portion 55 and its other leg perpendicular to the one leg. As shown in FIG. 8A the L-shaped portions 57 can be secured and are secured to the arm 53 by clamps 58 (shown in dotted lines so that the full configuration of the wire 54 is visible). Because the L-shaped portions are relatively rigid relative to the major portion 55, the wire 54 is fixed in position in spaced relation to the arm 53. The clamps 58 hold the L-shaped portions 57 firmly against the arm 53 fixing the major portion 55 in position. In the situation where the arm 53 is relatively long two or more of the devices 54 can be mounted end to end as is suggested by the dotted line version of the fragmentarily shown wire 54. In such an application a clamp may be used to increase strength and stability in the manner shown in FIG. 25 in clamp 219.

The antiperch device 54 is arranged so that the major portion 55 is parallel to and above the surface of the arm 53. In one embodiment of the invention the spacing of the major portion 55 from the surface was 3¼ inches, the spacing being determined by the length of the mounting portions 56. The wire 54 has sufficient stiffness to keep the birds from reaching the arm 53 but is also sufficiently flexible and has a small enough diameter that the birds cannot obtain a secure footing on the wire 54.

Figure 8D:
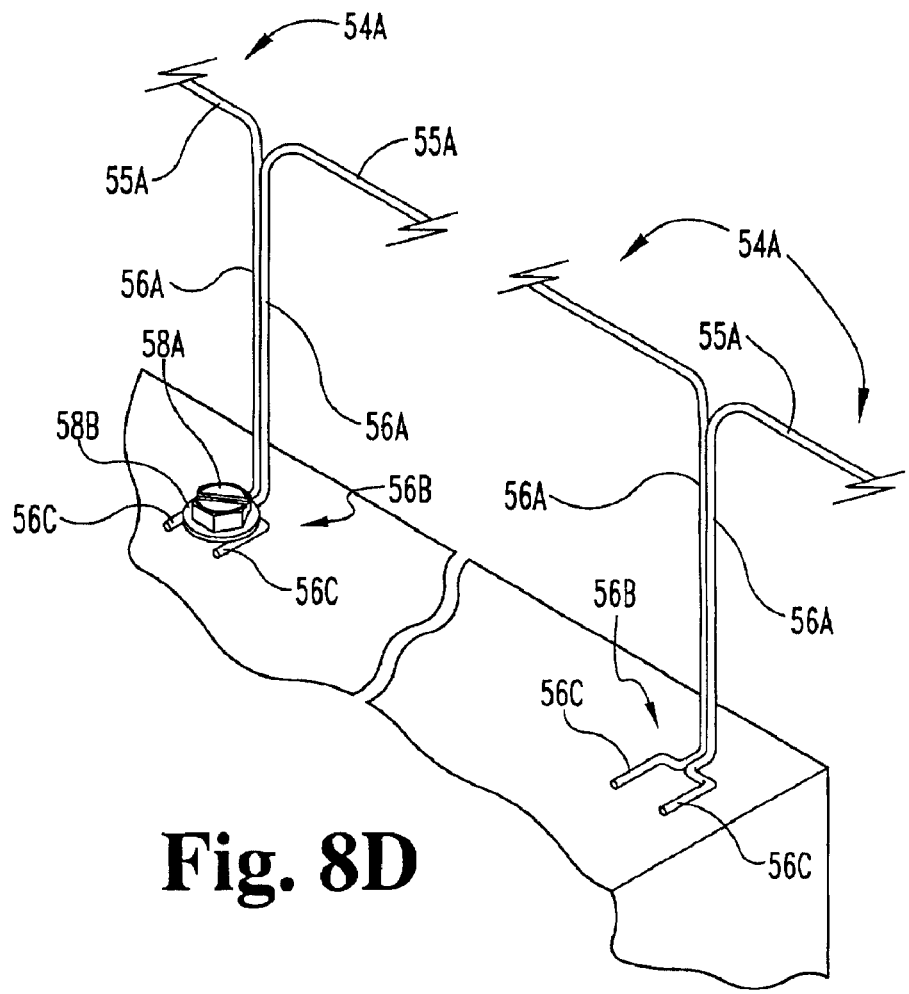
Figure 8E:
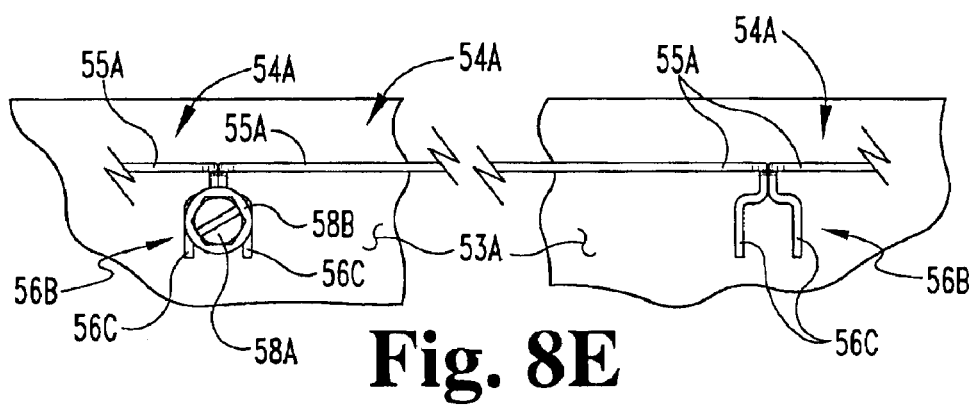
FIG. 8E is a top plan view of the embodiment of FIG. 8D.

Still another embodiment of the invention for providing a single wire is shown in FIGS. 8D and 8E. FIG. 8D is a perspective view of a series of wires 54A. Each of the wires 54A has a straight major portion 55A and a pair of mounting portions 56A at 90 degrees to the major portion. At the lower end of each mounting portion 56A is formed feet 56B which are not in the same plane as defined by major portion 55A and mounting portions 56B. Further the feet 56B extend at 90 degrees to the mounting portions 56A and include legs 56C that are spaced inwardly of the respective wire 54A whereby a single self tapping screw 58A and washer 58B is used to secure two adjacent legs 56C to the object 53A to be protected. Thus a series of wires 54A can be mounted on the object. In order to increase strength and stability a resilient sheet metal clamp such as the clamp 53 of FIG. 7B may be used to secure adjacent mounting portions 56B together.

Figure 9:
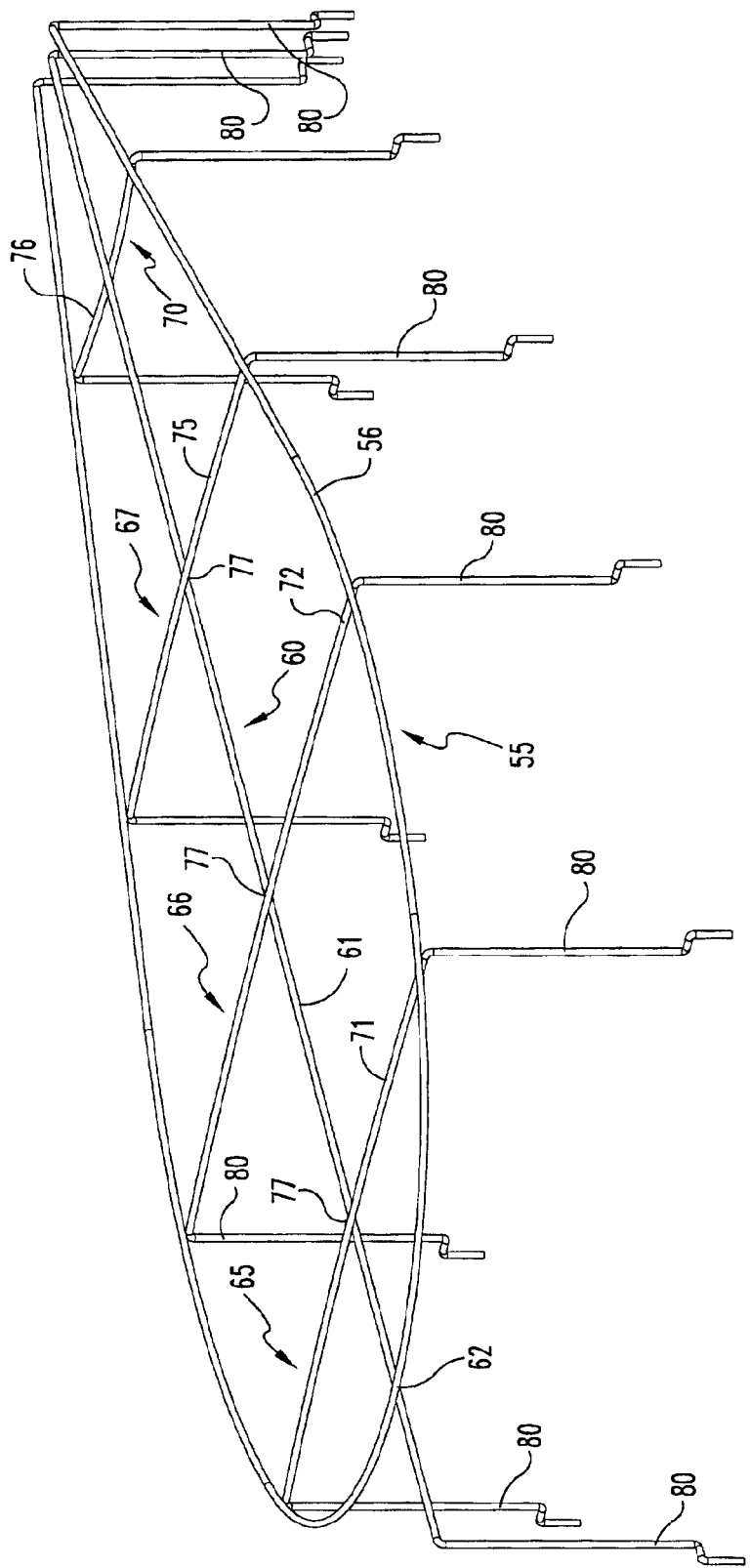
FIG. 9 is a perspective view of still another embodiment of the invention.
Figure 10:
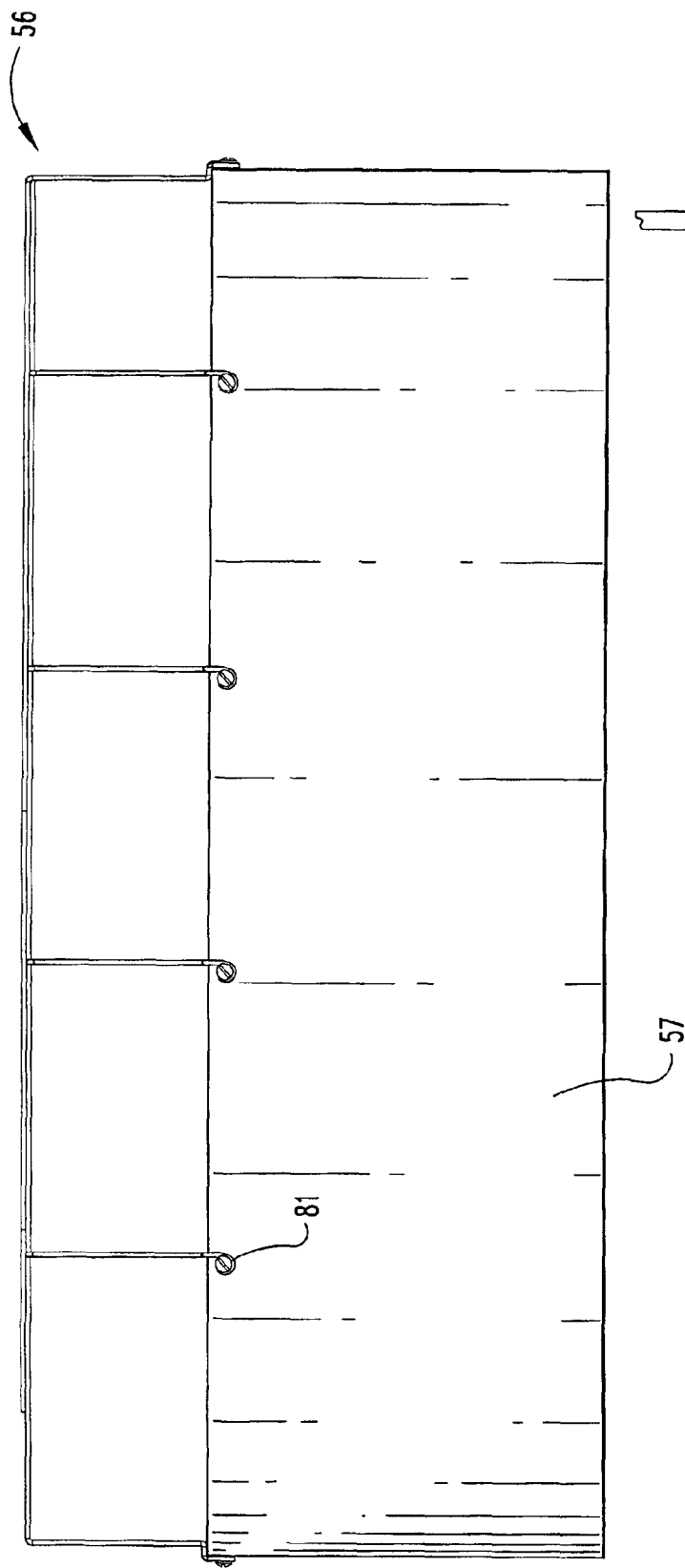
FIG. 10 is a side elevation of a light having mounted thereon the embodiment of FIG. 9.
Figure 11:
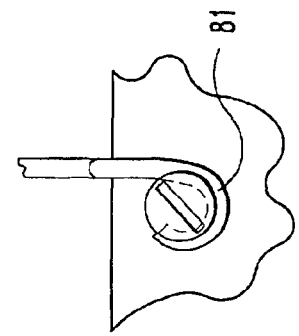
FIG. 11 is a detail view of a portion of the structure of FIG. 10.

Referring now to FIGS. 9, 10 and 11 there is illustrated another embodiment of the antiperch device for birds for mounting on an object to prevent the birds from perching on the object. The device of FIGS. 9, 10 and 11 includes a first elongated wire 55 which has a major portion 56 formed in a snowshoe shape. As shown in FIG. 10 the major portion 56 is spaced from an object 57 (a light) to be protected and is arranged in a plane which is parallel to the surface of the object and spaced above the object. In one embodiment of the invention this spacing is 3¾ inches. A second elongated wire 60 has a major portion 61 located centrally of the snowshoe shape and extending longitudinally of the snowshoe shape. The second wire is welded to the first wire at 62. Additional wires 65, 66, 67 and 70 each have major portions 71, 72, 75 and 76 which extend across the snowshoe shape and are welded to the first and second wires at each of their contacting points 77. (See FIG. 12)

Each of the elongated wires 55, 60, 65, 66, 67 and 70 has a pair of mounting portions 80 which function to mount the respective elongated wires on the object to be protected 57. Depending on the configuration of the object, mounting can be accomplished by means of clamps as above described in connection with the embodiment of FIG. 5 or can be accomplished by means of providing a loop 81 at the lower distal end of the mounting portion 80 as shown in FIG. 10 and in enlarged fragmentary view FIG. 11. The screw is then placed in the loop 81 and screwed into the object. Other alternative means of mounting the device to the object can be conceived such as for example welding nuts to the object when the object is manufactured so as to provide a means for easily mounting the antiperch device on the object. All such equivalent and alternative means for mounting the antiperch device are considered to be a part of the invention.

Figure 12:
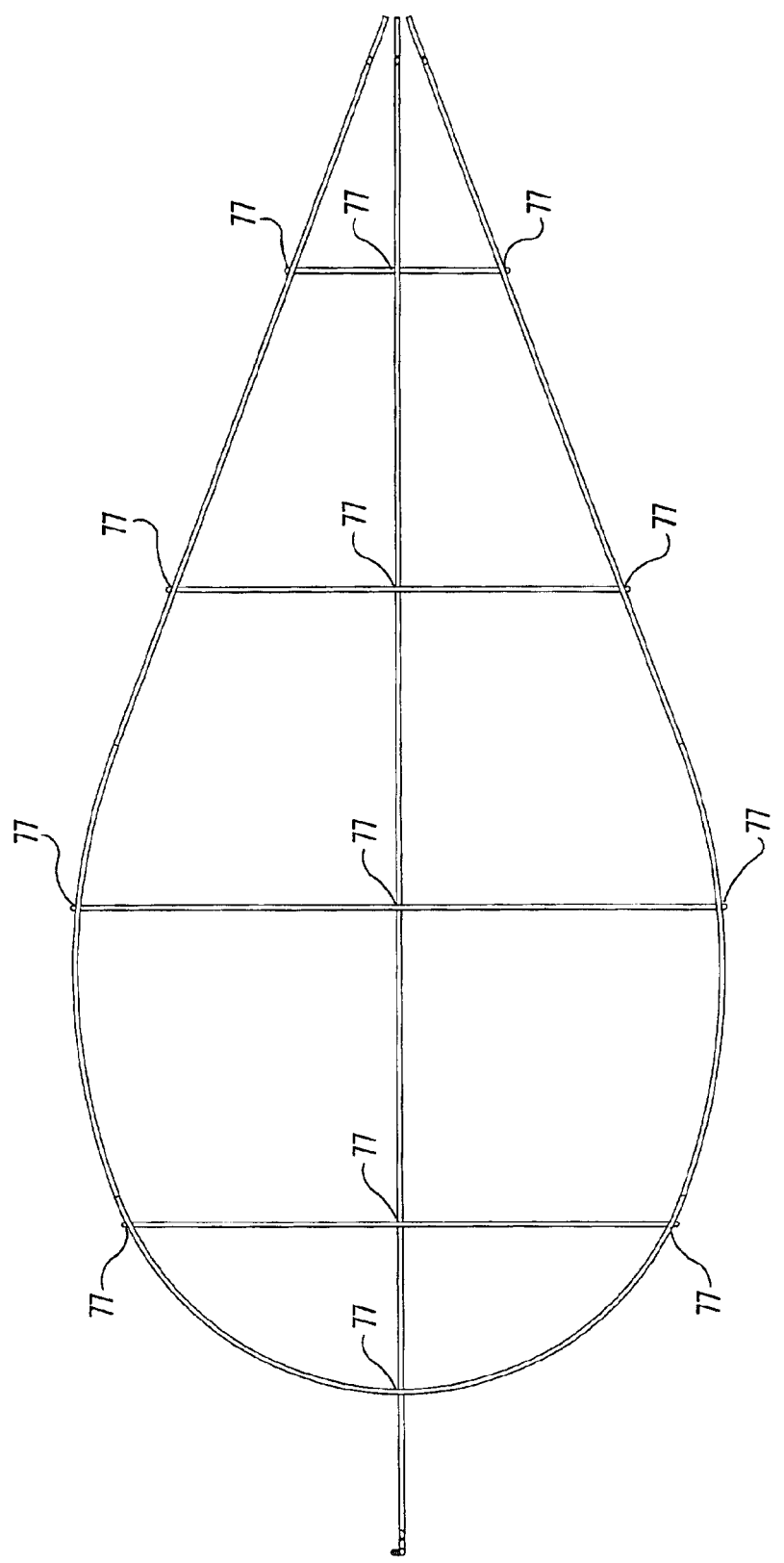
FIG. 12 is a top plan view of the structure of FIGS. 9, 10 and 11.
Figure 12A:
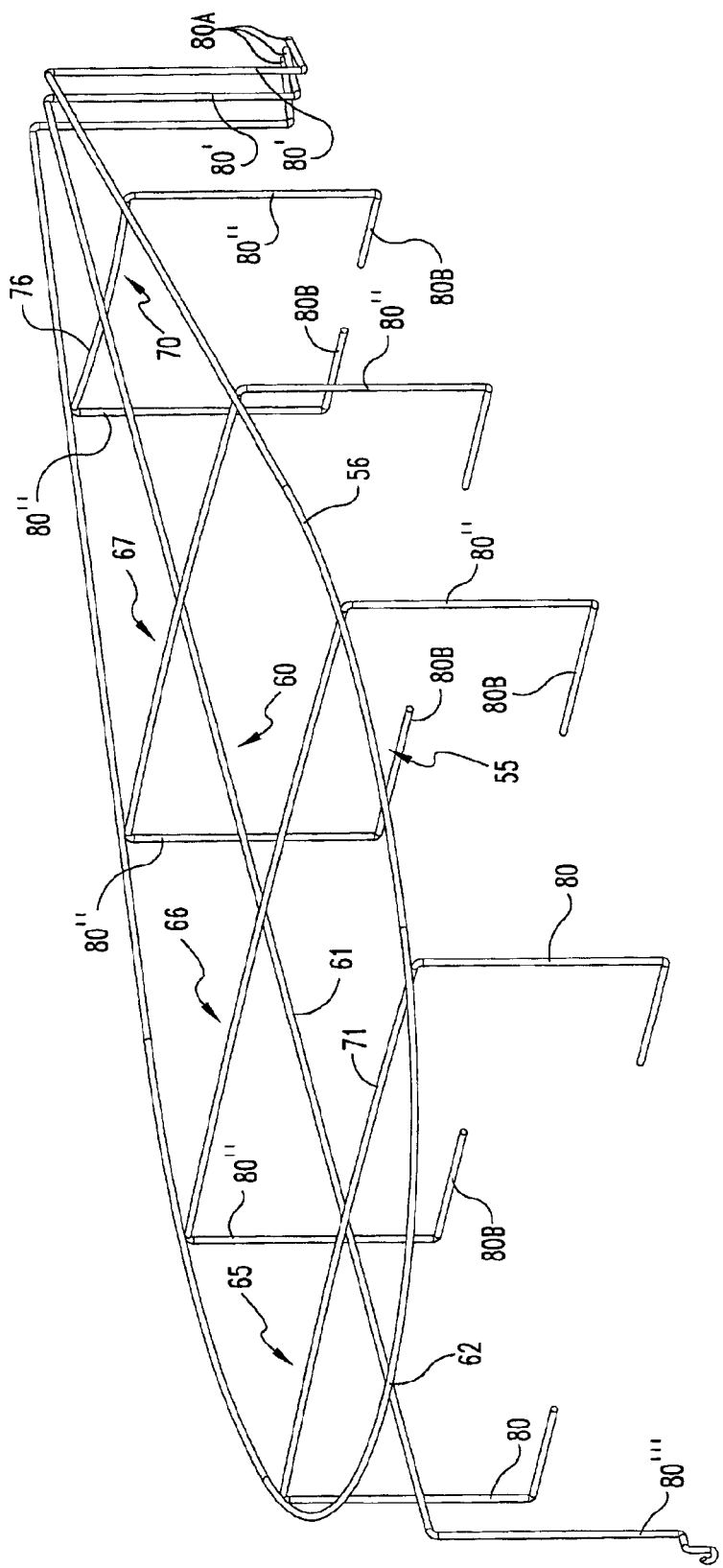
FIG. 12A is a perspective view similar to FIG. 9 of another embodiment of the invention.

FIG. 12A is a perspective view and FIG. 12 is a top plan view of an alternative but preferred embodiment of the invention which is identical to the embodiment of FIGS. 9, 10 and 11 except as described below. The embodiment of FIG. 12A has three feet 80A which extend perpendicularly from the mounting portions 80'. These feet are parallel to the arm of a light to be protected and can be clamped in place by the same type of clamp that clamps the wire 54 in place as shown for example in FIG. 8A in connection with a light arm. Also the embodiment of FIG. 12A has feet 80B wherein the mounting portions 80" are bent inwardly. The feet 80B make contact with and support the wires on the light. In such an embodiment the only mounting portion 80 to be attached with a screw as in FIG. 11 is the front wire mounting portion, 80'". Such an embodiment might be used for example with a Powerlight Roadway Luminaire manufactured by Powerlight Inc.

Figure 13:
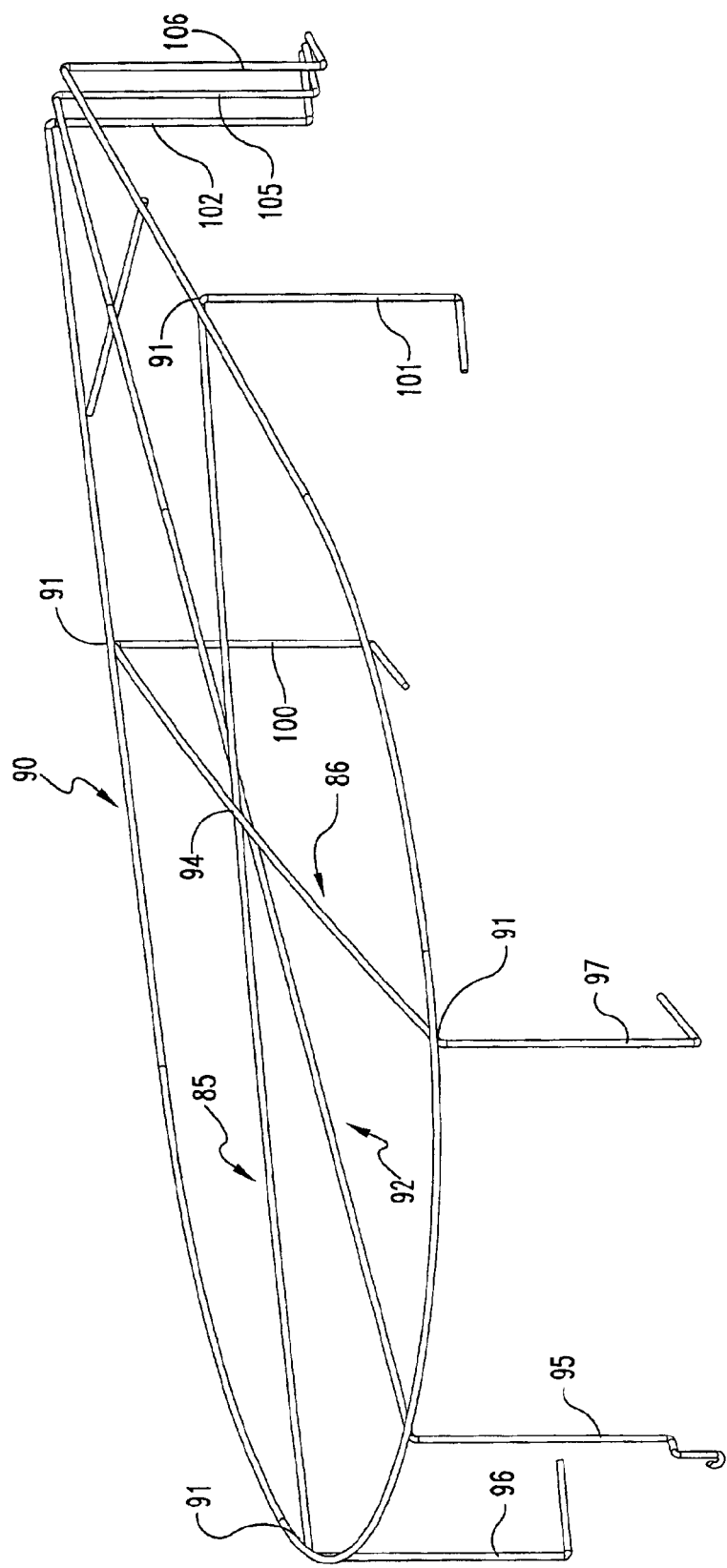
FIG. 13 is a perspective view of still another embodiment of the invention.
Figure 14:
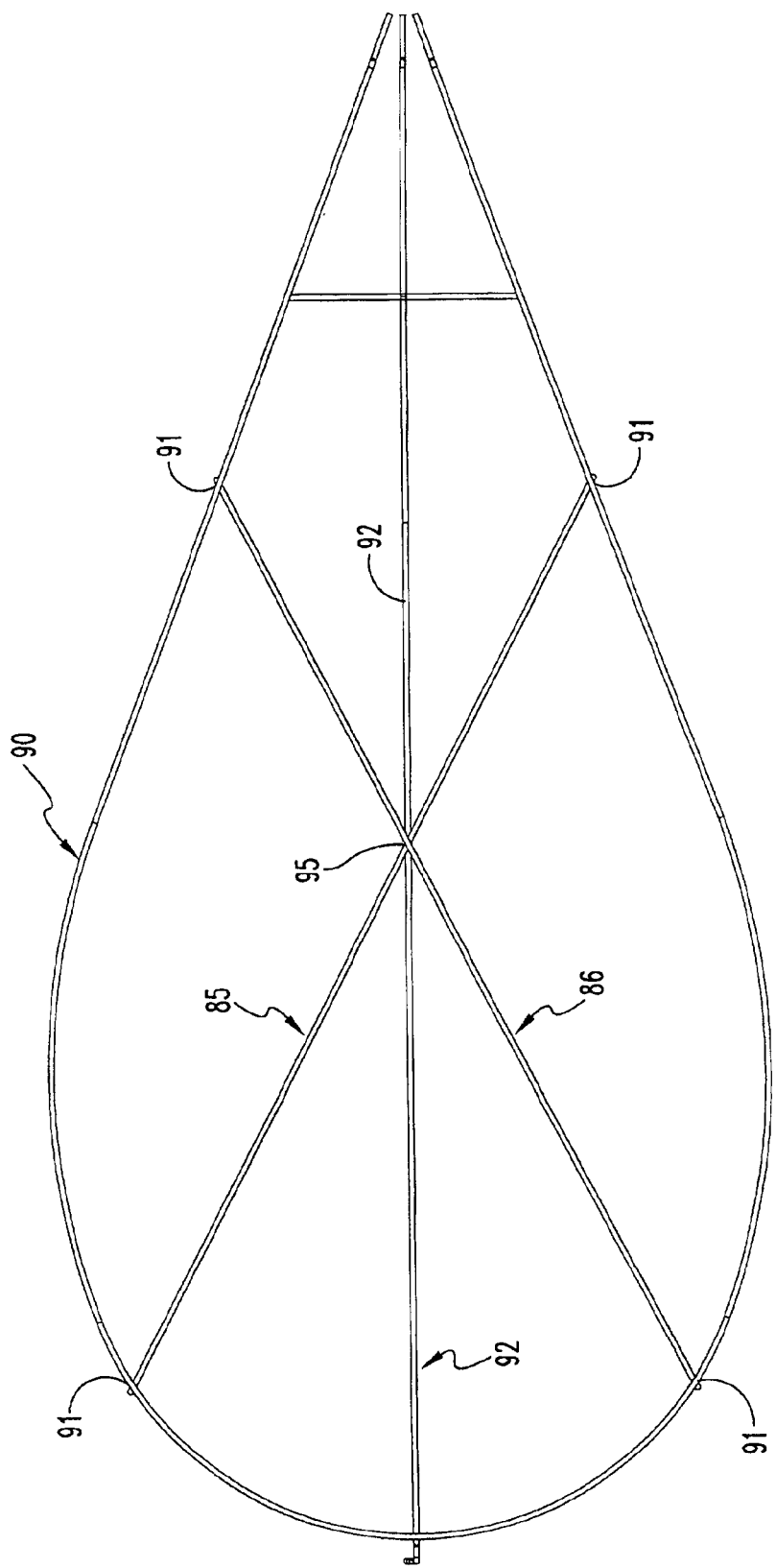
FIG. 14 is a top plan view of the structure of FIG. 13.

Referring now to FIGS. 13 and 14 there is illustrated an antiperch device which is somewhat similar to the embodiment of FIGS. 9–12 and 12A but instead replaces the wires 65, 66 and 67 with a pair of wires 85 and 86 that do not extend directly across the snowshoe shape of the embodiment of FIGS. 13 and 14 but instead cross one another and are welded to the elongated wire 90 that defines the snowshoe shape of the embodiment of FIGS. 13 and 14. The welds of the wires 85 and 86 to the wire 90 are located at 91. The embodiment of FIGS. 13 and 14 includes a further elongated wire 92 which functions similarly to the wire 60 of the embodiments of FIGS. 9–12 and 12A. The wire 92 is welded to the wires 85 and 86 at 94. As can be seen in FIG. 13 the embodiment of FIGS. 13 and 14 includes mounting portions 95, 96, 97, 100, 101, 102, 105 and 106 which function similarly to the mounting portions 80', 80" and 80'" of FIG. 12A. These mounting portions can have a loop at their lower distal end for receiving a screw (as 81 in FIG. 11) or can be clamped in position (as 80') depending upon the particular configuration of the object to be protected. Alternatively other mounting means can be used to secure the device of FIGS. 13 and 14 to the object to be protected.

All of the above described embodiments including the embodiment of FIGS. 13 and 14 include wires having sufficient stiffness to keep the birds from reaching the object but which are also sufficiently flexible and have a small enough diameter that the birds cannot obtain a secure footing on the wires. It has been found as mentioned above that appropriate wires having the appropriate stiffness are 0.062 inches or $\frac{1}{16}^{th}$ diameter type 302 or type 304 stainless steel spring wire and as 0.063 inches diameter type 316 stainless steel spring wire.

Figure 15:
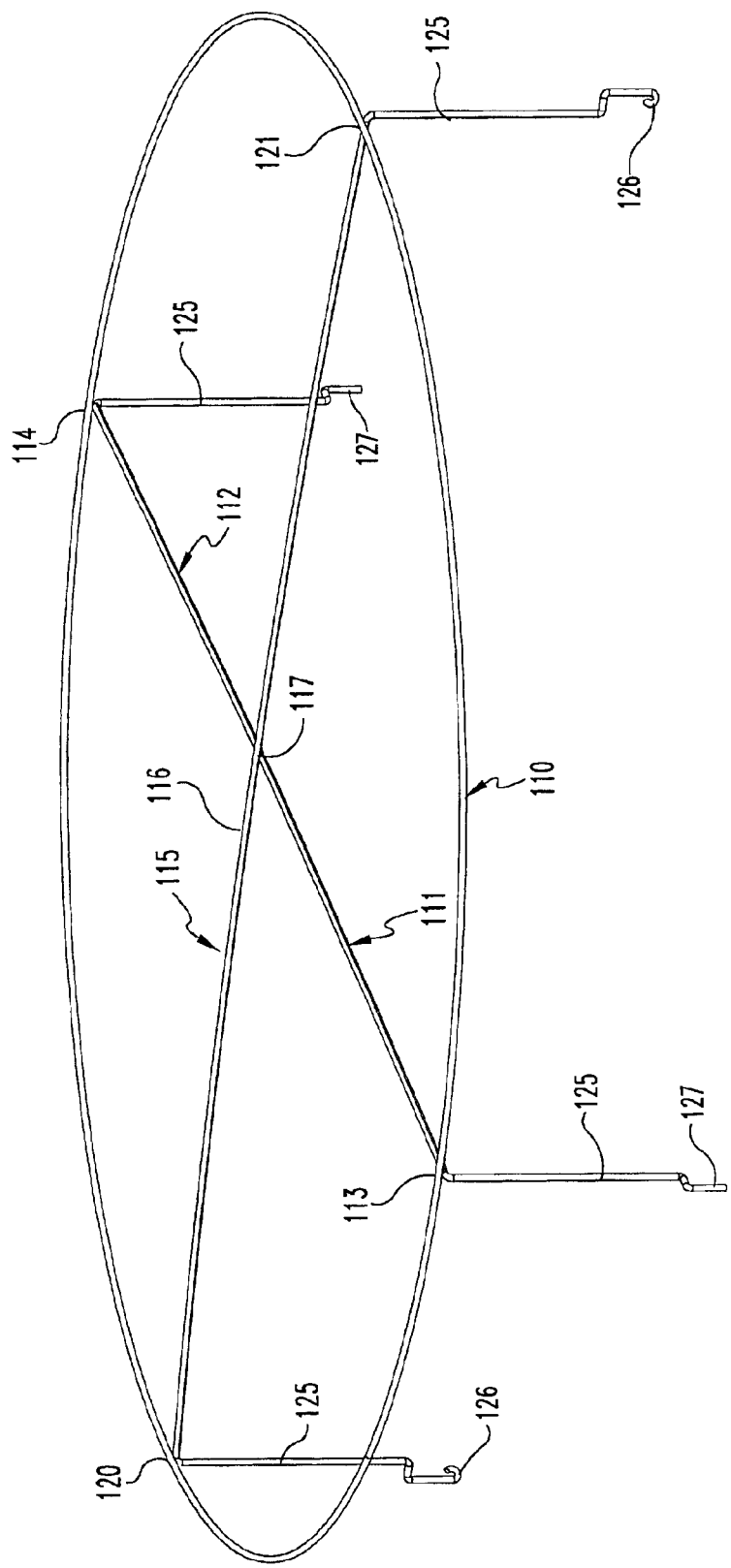
FIG. 15 is a perspective view of still another embodiment of the invention.

Referring now to FIG. 15 still another alternative embodiment of the invention includes an antiperch device including an elongated wire 110 formed into the shape of a circle. The device further includes a second elongated wire 111 which includes a straight major portion 112 that is welded at its opposite ends at 113 and 114 to the circular wire 110. Arranged perpendicularly to the major portion 112 of the wire 111 is a further wire 115 having a major portion 116 that is welded at 117 to the crossing major portion 112. The wire 115 is also welded at 120 and 121 to the circular wire 110.

The wires 115 and 111 include mounting portions 125 which extend perpendicularly from the major portion of the wires and function to mount the antiperch device on the object to be protected. In the fashion described above the mounting portions 125 may have loops 126 on them for receiving screws for attachment or may be formed in a L-shape as illustrated at 127 in the drawing FIG. 15 so as to provide alternative ways of mounting the antiperch device on the object to be protected. Still another version of the device of FIG. 15 would include inwardly directed feet such as the feet 80B of FIG. 12A (such inwardly directed feet replacing the feet 127).

Figure 16:
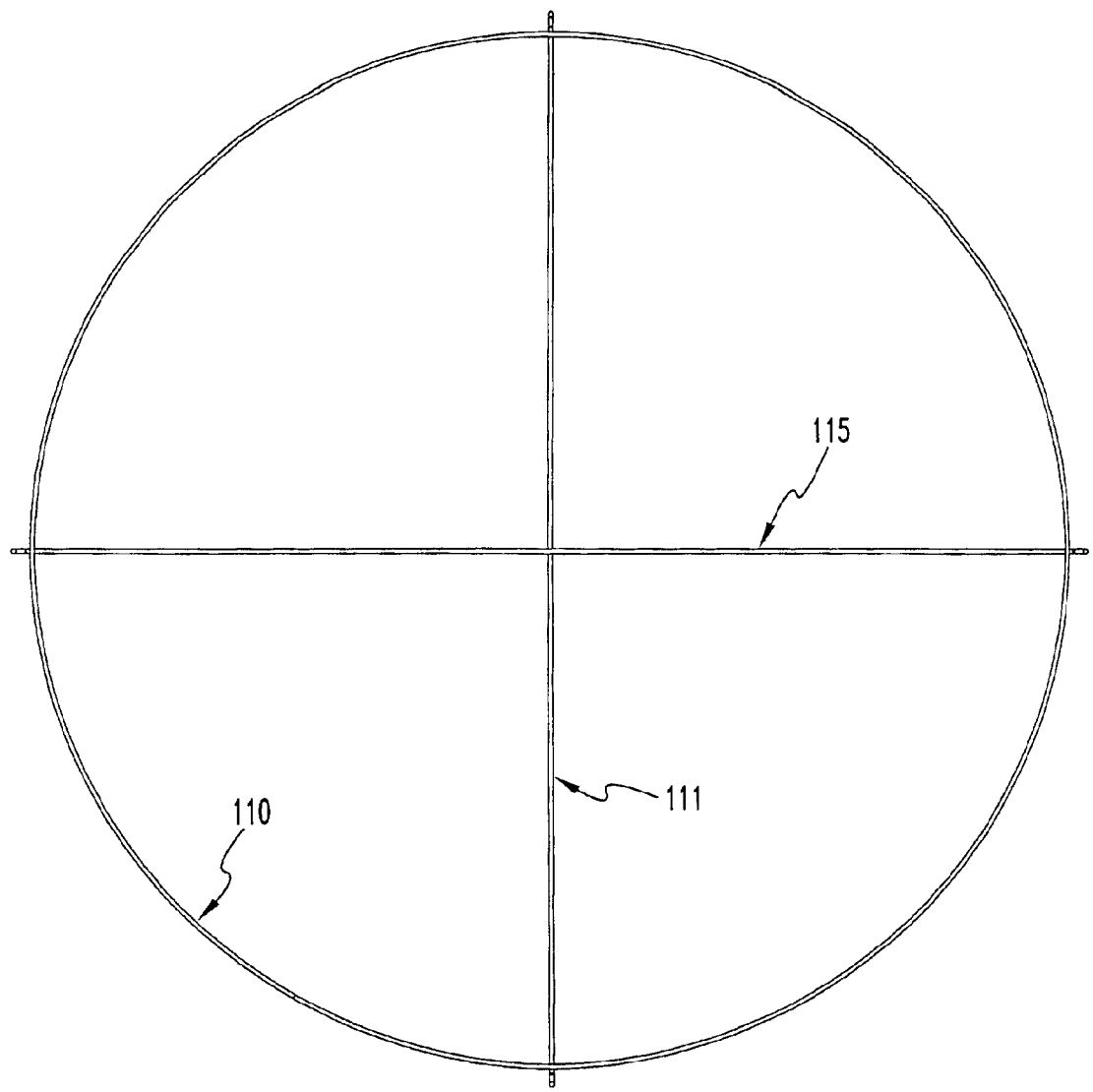
FIG. 16 is a top plan view of the structure of FIG. 15.
Figure 17:
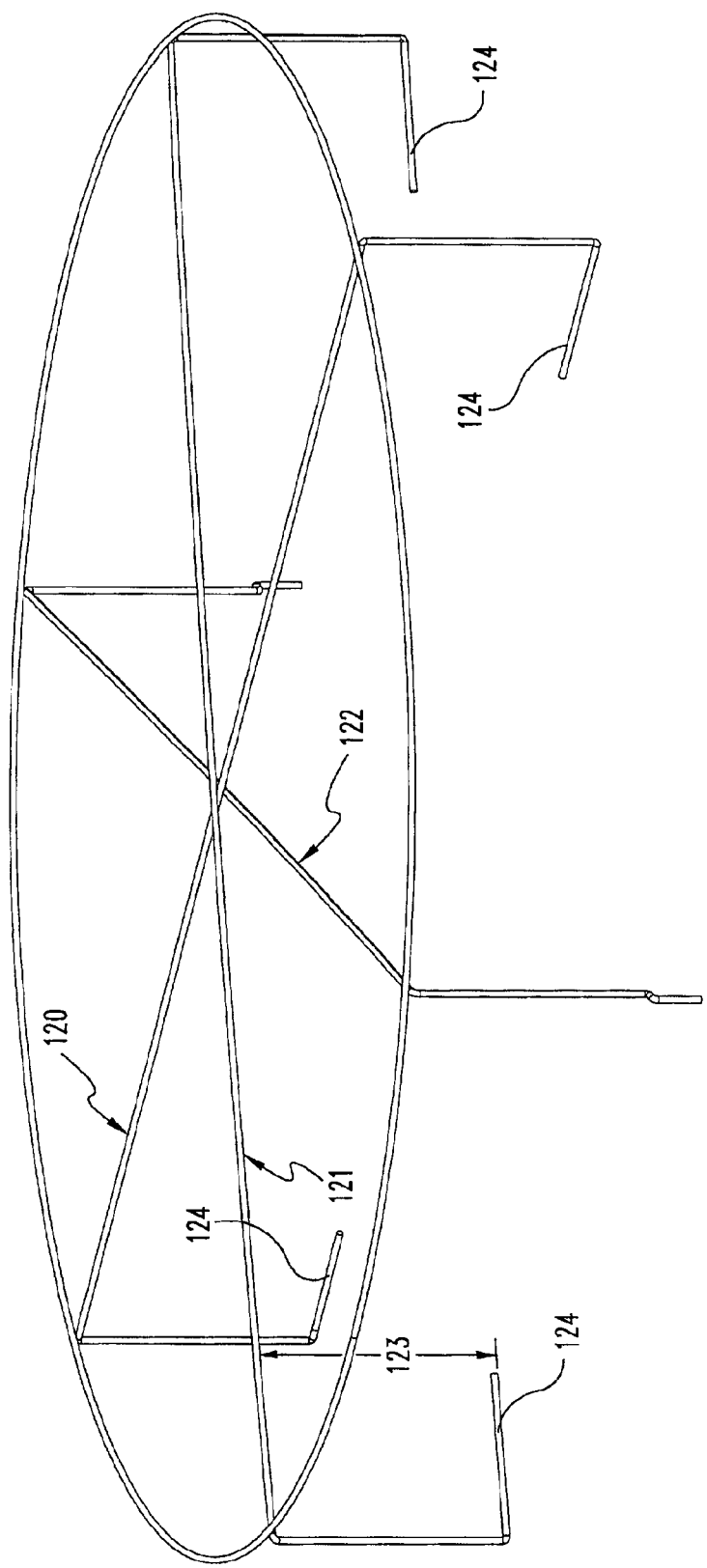
FIG. 17 is a perspective view of still another embodiment of the invention.
Figure 18:
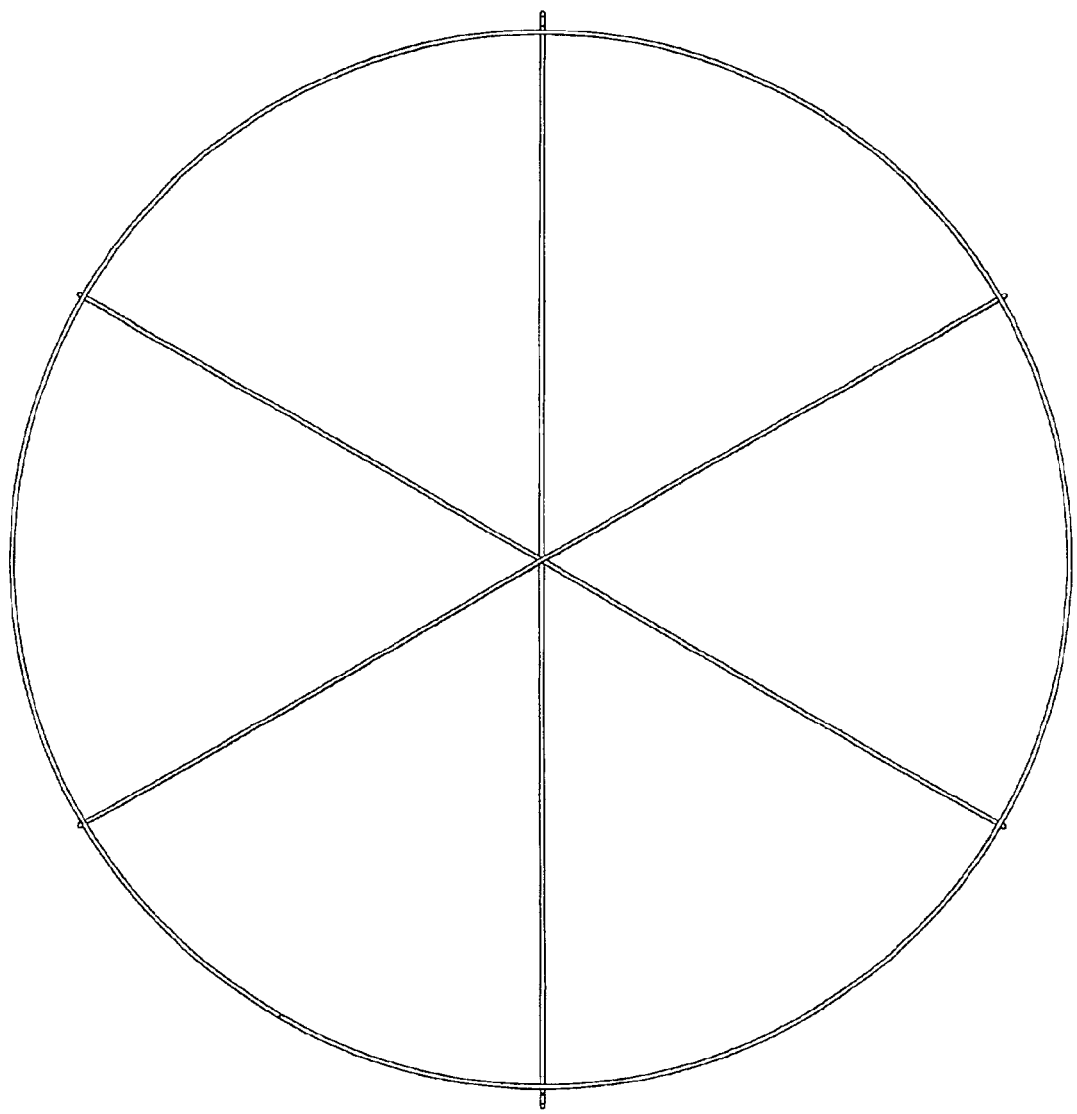
FIG. 18 is a top plan view of the structure of FIG. 17.

Referring now to FIGS. 17 and 18 the embodiment of these figures is identical to the embodiment of FIGS. 15 and 16 with the exception that three elongated wires 120, 121 and 122 are provided which are arranged at 60 degree angles to one another as opposed the use of two such wires 115 and 111 in the embodiment of FIGS. 15 and 16. Also the embodiment of FIG. 17 has feet 124 similar to the feet 80B of the embodiment of FIG. 12A. The feet 124 support the antiperch device on the light. In one example of the embodiment illustrated in FIGS. 17 and 18, the dimension 123 (FIG. 17) which determines the spacing from the object to be protected was 3½ inches.

Figure 19:
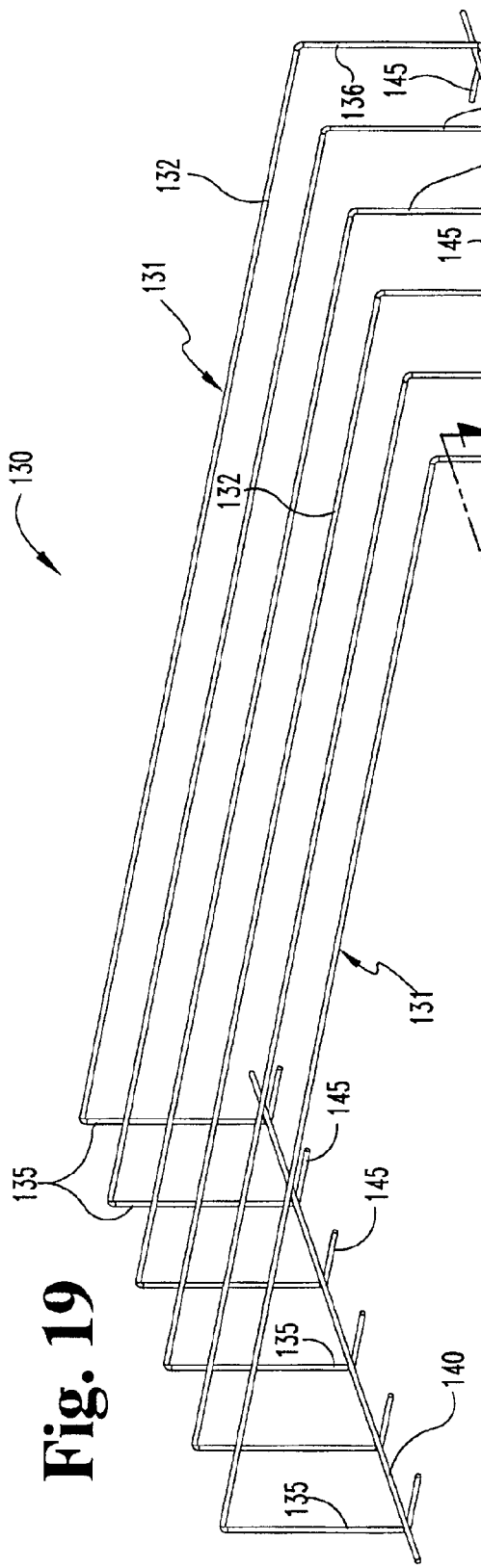
FIG. 19 is a perspective view of still another embodiment of the invention.
Figure 20:
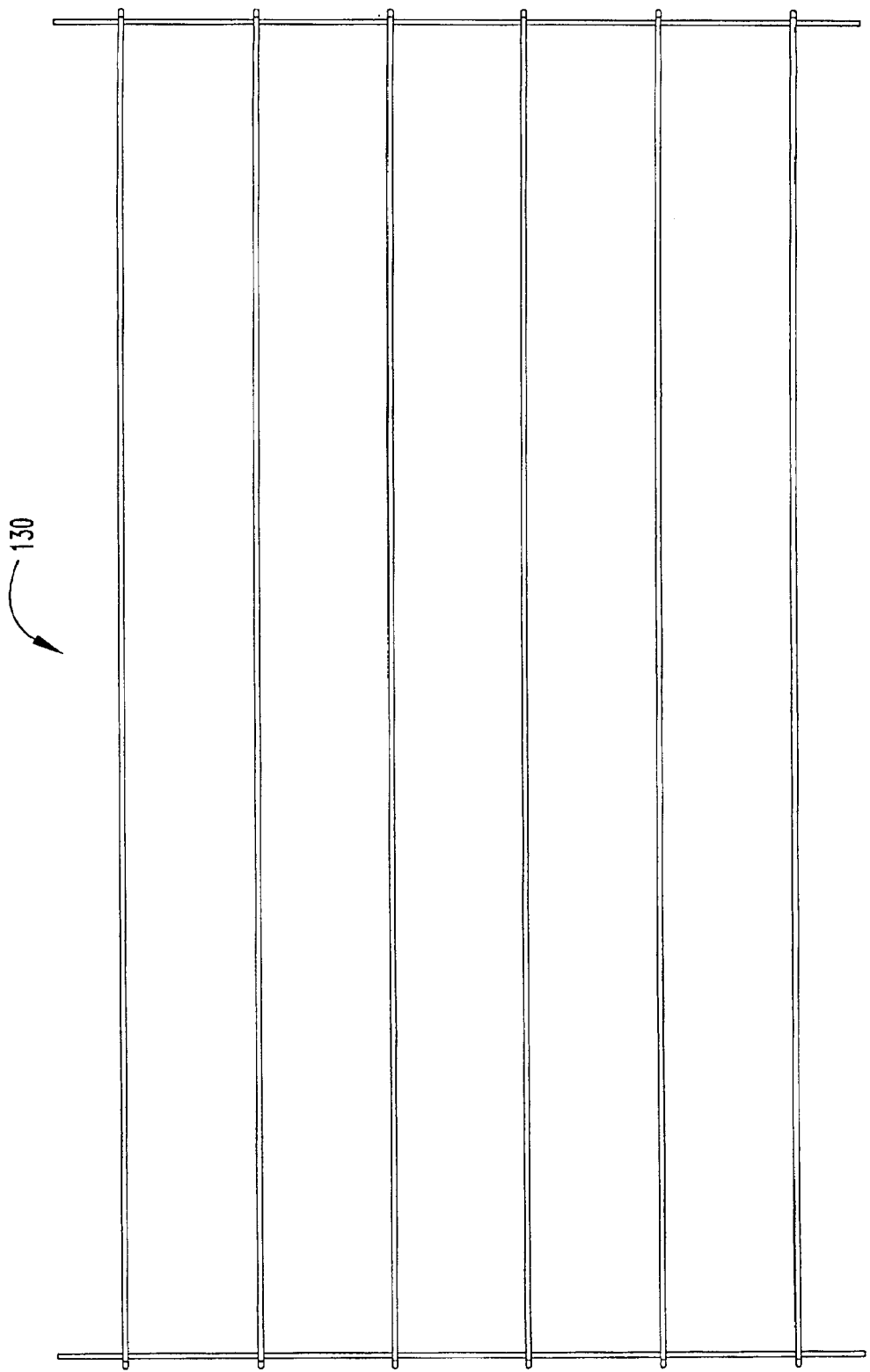
FIG. 20 is a top plan view of the structure of FIG. 19.

Referring now to FIGS. 19, 20, 21 and 22, there are illustrated two embodiments of the invention that are usable to protect an object having varying shapes. One or more of the devices shown in FIGS. 19, 20, 21 and 22 can be assembled and mounted on the object to protect it. Referring first to FIGS. 19 and 20, device 130 includes a plurality of wires 131 each having a straight major portion 132. Each of the major portions 132 is parallel to the other major portions 132 and is arranged in an equally spaced series which defines a plane that is adapted to be located parallel to the surface of the object and (in most cases) spaced above the object to be protected. The spacing might be on the order of one to four inches. In one specific embodiment the spacing is 3½ inches. Each of the wires 131 has a first mounting portion 135 and a second mounting portion 136. The first mounting portions 135 are all parallel to one another and are arranged in an equally spaced series which defines a plane. Similarly the mounting portions 136 are parallel to one another and are arranged in an equally spaced series which also defines a plane. A first wire 140 is welded to each of the first mounting portions 135. Similarly a second wire 141 is welded to each of the mounting portions 136. Each of the wires 140 and 141 is located so as to be at the surface of the object to be protected. Each of the mounting portions 135 and 136 extends perpendicularly from the major portion 132 to which it is connected.

Various means can be used to mount the device of FIGS. 19 and 20 to the object to be protected. Assuming for example that the object is a wooden device as opposed to a metal device, a U-shaped nail can be driven over the feet 145 each of which project inwardly from the distal end of the mounting portions 135 and 136. Of course each of the inwardly projecting wire portions 145 are extensions of the mounting portions 135 and 136 and extend perpendicularly to those mounting portions and in parallel relation to the major portion of the respective wires as illustrated in FIGS. 19 and 20. An alternative means for mounting the device of FIGS. 19 and 20 can be the means of mounting described above in connection with FIGS. 9 and 10 wherein a loop is provided on the end of the mounting portion and a screw is inserted through the loop. Of course other such mounting means can be appropriate.

Figure 21:
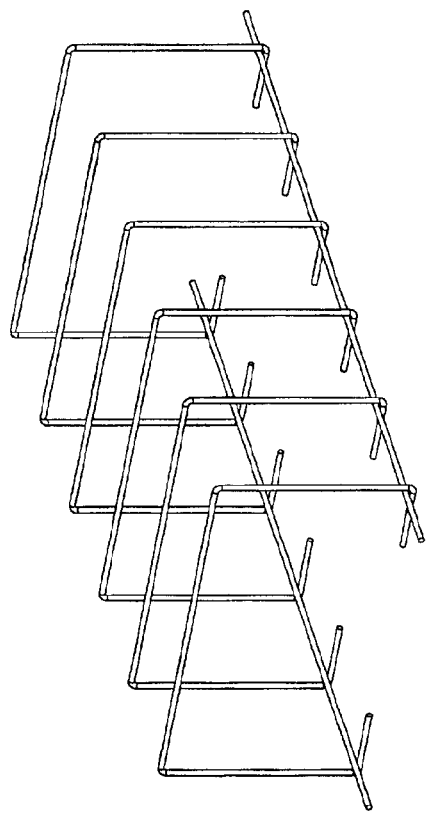
FIG. 21 is a perspective view of still another embodiment of the invention.
Figure 22:
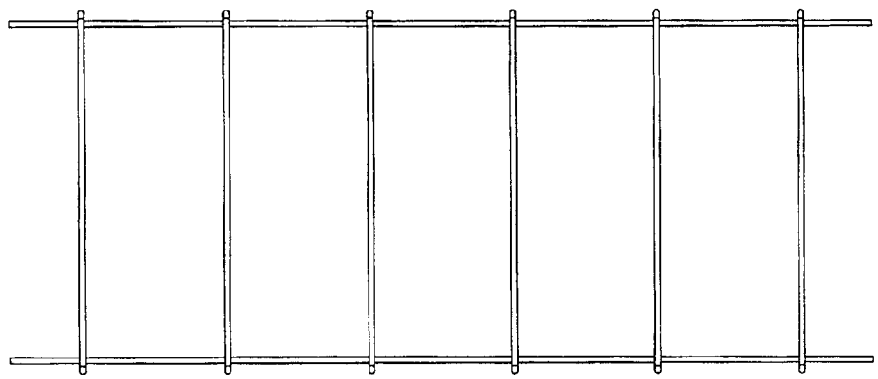
FIG. 22 is a top plan view of the structure of FIG. 21.

The device of FIGS. 19 and 20 when viewed as illustrated in the top plan view of FIG. 20 has a dimension of 1 foot×2 feet. Alternatively the device can be constructed as shown in FIGS. 21 and 22 wherein the dimensions of the device as viewed from above in FIG. 22 is 6 inches×1foot. Another appropriately sized device would be constructed in similar fashion but would have a dimension of 1 foot×1 foot when viewed from above. It can be appreciated that with various sized devices such as 6 inches×1 foot, 1 foot×2 feet and 1 foot by 1 foot, a particular object can be protected by an assembly of one or more of the various sized devices to appropriately cover the object to be protected.

Figure 19A:
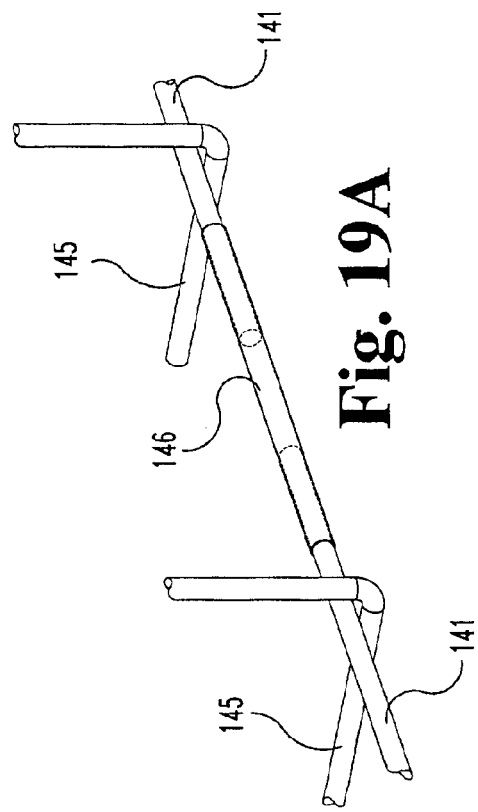
FIG. 19A is a fragmentary perspective view showing a manner of mounting the device of FIG. 19.
Figure 19B:
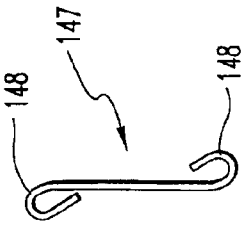
FIG. 19B is a side elevation of a device for mounting the devices of this invention.

FIGS. 19A and 19B show additional ways of mounting the antiperch devices of FIGS. 19, 20, 21 AND 22. Referring first to FIG. 19A there is illustrated a tube 146 which has a sufficiently large internal diameter to slide over and receive the wires 141 of two adjacent devices 130. The tube 146 is sufficiently short to permit the wires 132 of one device 130 to be spaced from the adjacent device 130 equal to the spacing apart of two adjacent wires in a single device 130.

As mentioned above various means can be used for mounting the antiperch devices on an object to be protected. Referring to FIG. 19A, a U-shaped nail can be driven over the tube 146 into a wood object thus securing two adjacent devices 130 in place. Alternatively a staple gun can be used to fire a staple over the tube 146 and into relatively soft material such as wood. Such nails or staple guns should be used at multiple locations on opposite sides of the device 130 and the other herein disclosed devices in order to effect a secure and lasting mounting of the devices.

FIG. 19B illustrates a double looped device 147 that can be used to mount the device 130 on the vertical side of a horizontal area to be protected. An example might be the vertical side of a bridge. The device 130 would be mounted by inserting the wire 141 through one of the loops 148 and a screw or fastener would be inserted through the other loop into the vertical side of the bridge. Of course the devices 147 would be used at each end of the wire 141 and 140 thus requiring four such devices 147 to secure one device 130 in place. This method can be used to mount the device on the top part of a horizontal surface where the space is limited and would require vertical mounting. Only two devices 147 would be needed for this.

Figure 19C:
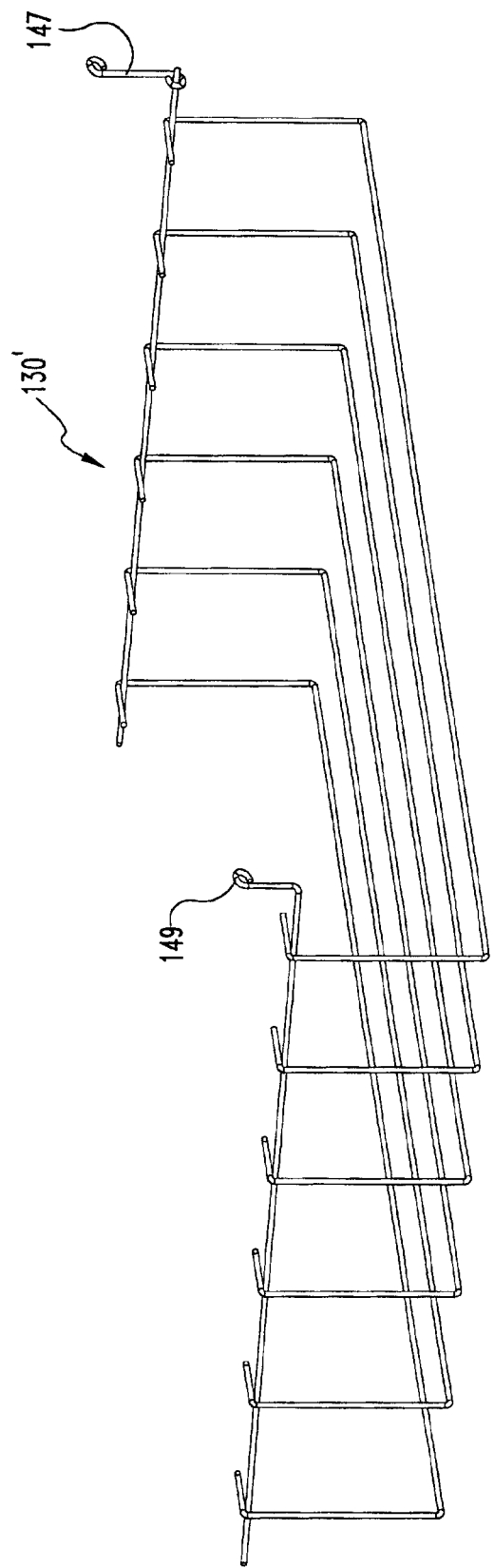
FIG. 19C is a perspective view of a further embodiment of the invention.

FIG. 19C shows a device 130' that can be mounted on the underside of a structure such as for example a bridge which is accessible to birds but attaching is difficult due to the limited space. As illustrated in FIG. 19C the attaching means may be integral with the antiperch device 130' as shown by the loop 149 or the device 147 may be used to mount the device 130'.

Figure 23:
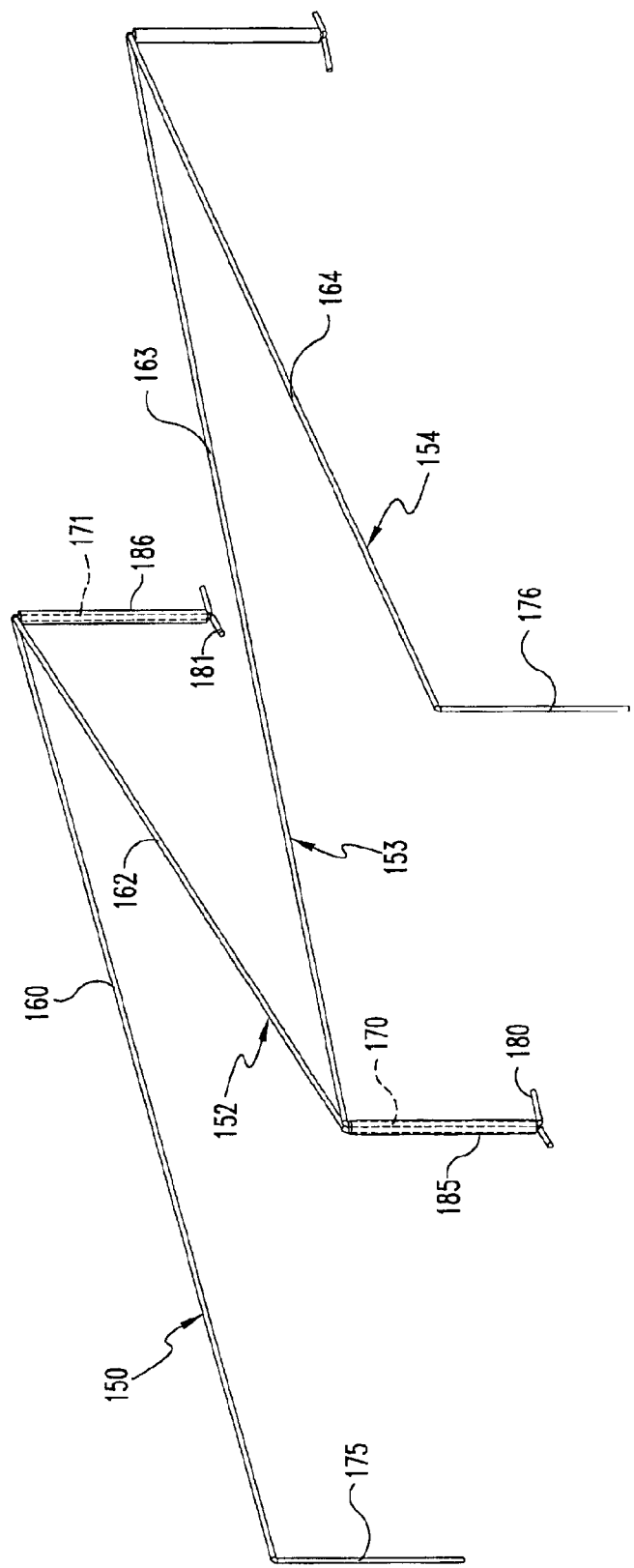
FIG. 23 is a perspective view of still another embodiment of the invention.
Figure 24:
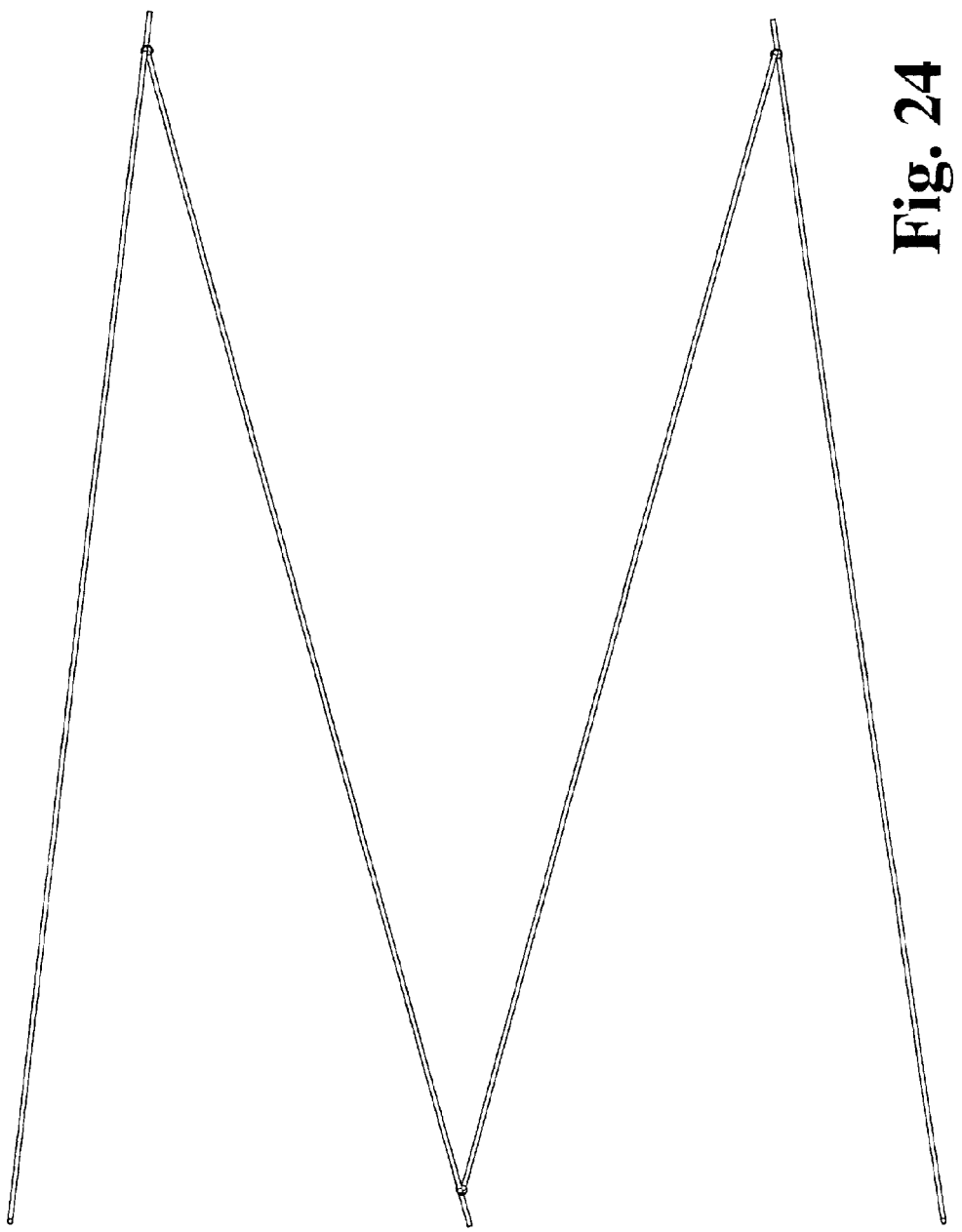
FIG. 24 is a top plan view of the structure of FIG. 23.

Referring now to FIGS. 23 and 24 still another alternative embodiment of the invention is illustrated which includes a plurality of wires 150, 152, 153 and 154 each having a straight major portion 160, 162, 163 and 164. Each of the wires 150, 152, 153 and 154 has a first mounting portion and a second mounting portion 170, 171, 175 and 176. The mounting portions 170 and 171 each have a foot 180 and 181 on them whereas the mounting portions 175 and 176 are straight and are not bent at their ends. The feet 180 and 181 are provided after inserting the mounting portions into tubes 185 and 186. The feet 180 and 181 retain the mounting portions in the tubes 185 and 186.

The structure of FIGS. 23 and 24 can be easily shipped from place to place and easily transported from place to place in order to mount on an object to be protected a relatively long single wire type protective device. It should be noted that the various wires 150, 152, 153 and 154 can be pivoted to cause the device of FIGS. 23 and 24 to have a desired configuration for mounting on an object to be protected. In some cases this may be a relatively long object in which the protected device is straight and in other cases it may have the configuration such as illustrated in FIG. 24. After the device is assembled into the shape desired the feet 180 and 181 are forced against and mashed against the tube 170 and 171 in order to fix the wires 150, 152 and 153 at the angles to which they are placed prior to the bending action being carried out against the feet. The wires will then retain the specific angles of pivoted relationship when they are mounted on the object to be protected.

The embodiment of FIGS. 23 and 24, as do all of the described embodiments, uses 0.062" or $\frac{1}{16}^{th}$ diameter type 302 or 304 stainless steel spring wire or 0.063" diameter type 316 stainless steel spring wire. The length of the mounting portions 170, 171, 175 and 176 is 3½ inches in one embodiment which determines the typical spacing from the object to be protected.

Figure 25:
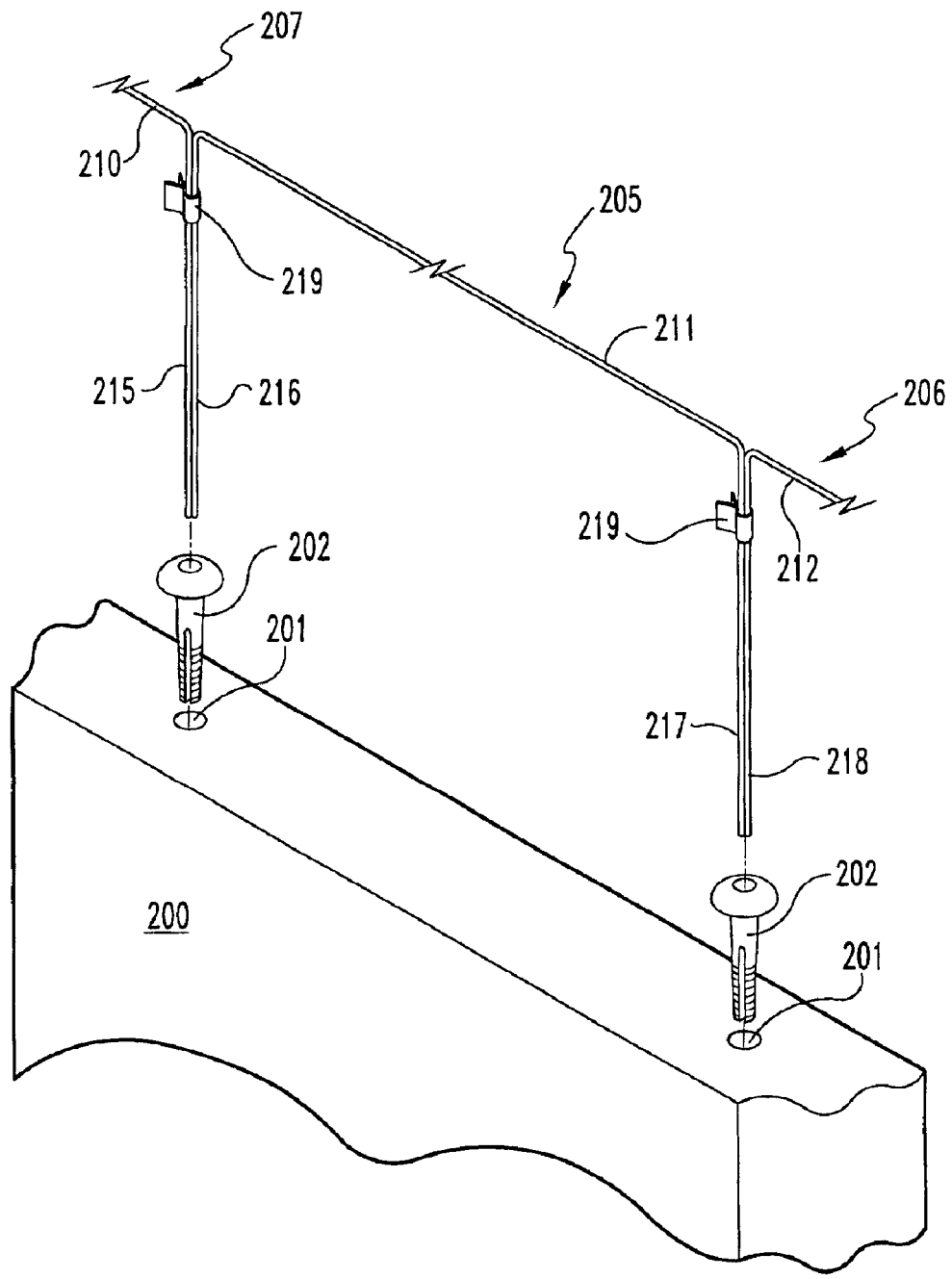
FIG. 25 is an exploded perspective view of another embodiment of the invention.

Referring now to FIG. 25, there is illustrated a typical antiperch device arrangement for the top of a billboard. Present day billboards are being constructed by stretching big sheets of vinyl around a frame similarly to a painter's arrangement of a canvas for painting. Thus in FIG. 25 the vinyl covered wood or steel billboard 200 is punched with bores 201 into which plastic inserts 202 are driven. The wires 205, 206 and 207 are then inserted into the plastic inserts. The wires 205, 206 and 207 each include major portions 210, 211 and 212 which are on the order of 2 to 3 feet in length. The wires 205, 206 and 207 also include mounting portions 215, 216, 217 and 218 which are inserted into the plastic inserts. The mounting portions are sufficiently long so that when they are inserted into the plastic inserts and the inserts are mounted in the billboard the major portions 210, 211 and 212 are positioned above the billboard approximately 3½ inches. When the billboard is changed with a new vinyl the wires are merely pulled out and reinserted through the new vinyl. Resilient sheet metal clamps 219 identical to the clamp 53 of FIG. 7B are provided to grip the mounting portions 215, 216, 217 and 218 to provide strength and stability to the antiperch device.

Figure 26:
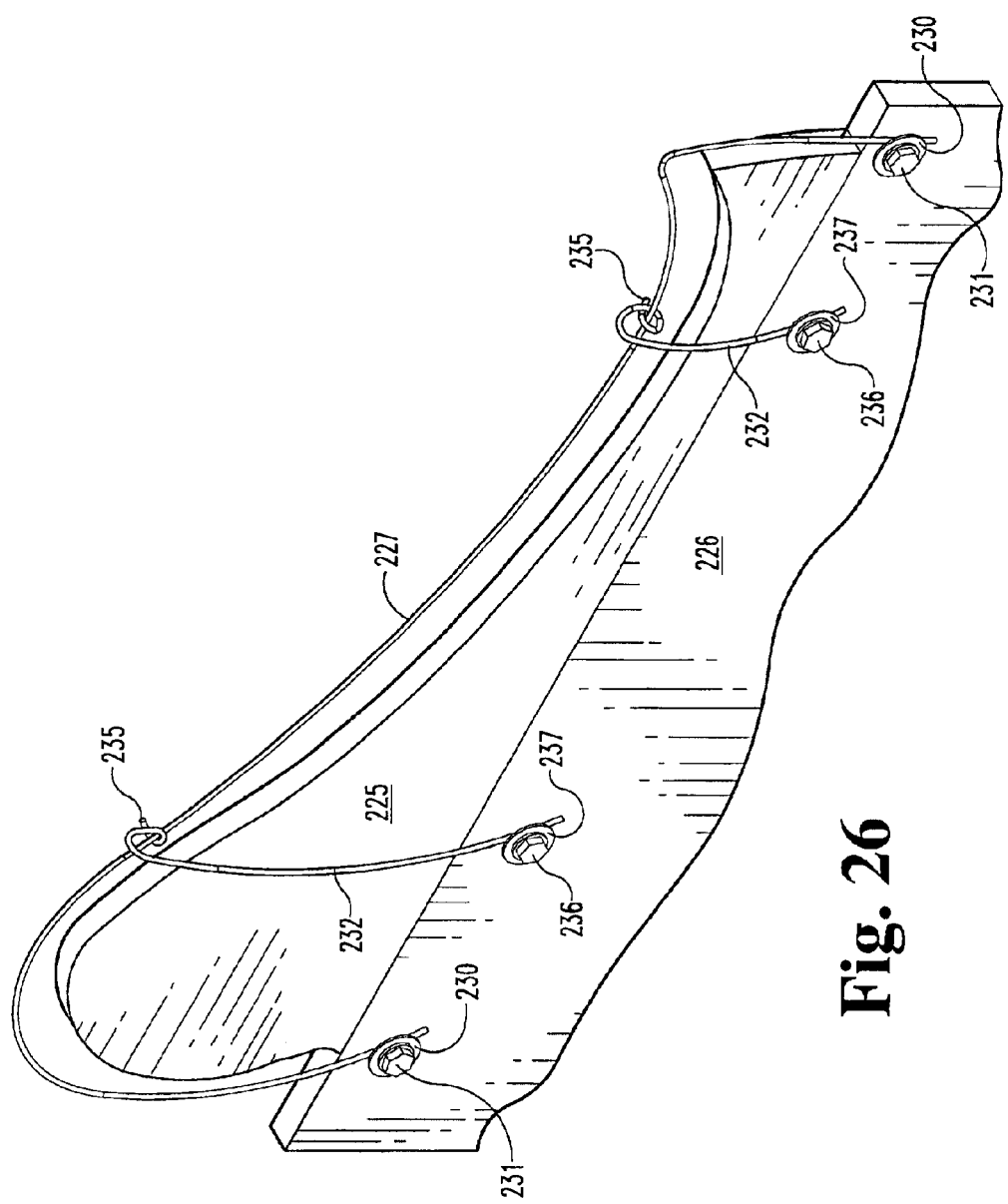
FIG. 26 is a perspective view of still another embodiment of the invention.

FIG. 26 shows the adaptation of the invention to the "extra design" that billboards frequently incorporate. The object is to fit the wire to the design that extends outside of the basic rectangle 226 of the billboard and keeps the birds from roosting. The wire 227 is mounted in spaced relation to and above the design by approximately 3 to 4 inches. The ends of the wire 227 are secured to the board by washers 230 received on self-tapping screws 231. Additional support is provided by wires 232 which are provided with loops 235 at their ends which loops surround and support the wire 227. The wires 232 are secured in place to the sign by self-tapping screws 236 and washers 237.

FIG. 27 is provided to show the application of the invention to objects such as light fixtures and the like which are mounted at an angle. The object 250 to be protected has a surface 251 that is at, for example, 45 degrees to the vertical. Thus the bird would desire to perch on the edge 257.

The antiperch device 252 projects from the object 250 vertically upward and at a 45-degree angle to the surface 251 and is mounted in place by self-tapping screws 255 projecting through washers 256. As illustrated the device 252 forms an arc similarly to the embodiment of FIG. 1. Alternatively the wire 252 can be formed at right angles as the embodiment of FIG. 25. The concept is that the birds want to be upright. When they land on the object, they stand straight up. Therefore whatever angle the object is the antiperch device should be above it thus preventing the birds from perching.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. For example, the terms "object" and/or "object to be protected" is used in the following claims and is intended to include any and all items that are desired to be protected, such as, for example, buildings, light fixtures, billboards, narrow ledges, etc.

What is claimed:

1. An antiperch device for birds for protecting the surface of an object comprising a pair of elongated wires having a major portion of their length arranged parallel to said surface of the object and spaced above the object, said wires having sufficient rigidly resilient stiffness to keep the birds from reaching the object but also being sufficiently flexible and having a small enough diameter that the bird cannot obtain a secure footing on the wire;

wherein the elongated wires include a pair of mounting portions each extending perpendicularly from an opposite end of said major portion, each of said mounting portions having a foot extending therefrom; and wherein said feet include legs that are spaced inwardly of the respective wires whereby a single screw and washer may be used to secure a pair of said legs to the object to be protected with respective mounting portions of the two devices parallel to and adjacent one another.

2. An antiperch device for birds for protecting the surface of an object comprising an object having a surface, pair of elongated wires having a major portion of their length arranged parallel to said surface of the object and spaced above the object, said wires having sufficient stiffness to keep the birds from reaching the object but also being sufficiently flexible and having a small enough diameter that the bird cannot obtain a secure footing on the wires, said wires being connected directly to the surface of the object;

wherein the elongated wires include a pair of mounting portions each extending perpendicularly from an opposite end of said major portion, each of said mounting portions having a foot extending therefrom; and wherein said feet include legs that are spaced inwardly of the respective wires whereby a single screw and washer may be used to secure a pair of said legs to the object to be protected with respective mounting portions of the two devices parallel to and adjacent one another.

* * * * *